(12) United States Patent
Feiler et al.

(10) Patent No.: US 10,753,483 B2
(45) Date of Patent: Aug. 25, 2020

(54) MATERIAL SUPPLY SYSTEM WITH VALVE ASSEMBLY

(71) Applicant: Ecolab USA Inc., St. Paul, MN (US)

(72) Inventors: Thaddeus Hans Feiler, South St. Paul, MN (US); Hope Emily Weilage, St. Paul, MN (US); Kenneth Thomas Dobizl, Mounds View, MN (US); Michael Henry D'Heilly, St. Paul, MN (US); Nathan John Millner, Oakdale, MN (US)

(73) Assignee: Ecolab USA Inc., St. Paul, MN (US)

( * ) Notice: Subject to any disclaimer, the term of this patent is extended or adjusted under 35 U.S.C. 154(b) by 148 days.

(21) Appl. No.: 15/814,680

(22) Filed: Nov. 16, 2017

(65) Prior Publication Data
US 2018/0142792 A1    May 24, 2018

Related U.S. Application Data

(60) Provisional application No. 62/424,795, filed on Nov. 21, 2016.

(51) Int. Cl.
    *F16K 3/08*      (2006.01)
    *B65G 69/18*      (2006.01)
    (Continued)

(52) U.S. Cl.
    CPC ............. *F16K 3/08* (2013.01); *B65G 69/183* (2013.01); *F16K 11/074* (2013.01); *F16K 27/045* (2013.01)

(58) Field of Classification Search
    CPC ........ F16K 3/08; F16K 11/074; F16K 27/045; F16K 11/076; F16K 3/085; B65G 69/183;
    (Continued)

(56) References Cited

U.S. PATENT DOCUMENTS

| | | | | |
|---|---|---|---|---|
| 82,728 A | * | 10/1868 | Loomis ...................... | F16K 3/08 |
| | | | | 137/625.31 |
| 1,226,722 A | * | 5/1917 | Sullivan ................. | B65D 83/06 |
| | | | | 141/268 |

(Continued)

FOREIGN PATENT DOCUMENTS

| | | |
|---|---|---|
| AR | 242752 A1 | 5/1993 |
| AU | 2003237240 B9 | 2/2004 |

(Continued)

OTHER PUBLICATIONS

European Patent Office, International Search Report in International Patent Application No. PCT/US2017/061934, 7 pp. (dated Apr. 30, 2018).

(Continued)

*Primary Examiner* — Marina A Tietjen
(74) *Attorney, Agent, or Firm* — Leydig, Voit & Mayer, Ltd.

(57) ABSTRACT

A material supply assembly includes a valve assembly having an outer valve member and an inner valve member rotatable relative to the outer valve member. A plurality of discharge seals may be provide between the outer valve member and the inner valve member, with one of the discharge seals extending around openings of the outer valve member or openings of the inner valve member. A first circumferential seal may also be provided. An engagement structure including a plurality of spaced apart vertical engagement projections and a plurality of complementary configured engagement recesses may be provided between the valve assembly and the base. A locking arm having a locking member may be provided with the locking member positioned in a locking receptacle. A projection engages the locking arm to move the locking member from the locking receptacle.

19 Claims, 17 Drawing Sheets

(51) Int. Cl.
*F16K 11/074* (2006.01)
*F16K 27/04* (2006.01)

(58) Field of Classification Search
CPC ..... F17C 13/04; B65D 47/046; B65D 47/265; B67D 3/0032; B67C 11/04; B67C 11/06; Y10T 137/86743
USPC ....... 141/346, 268, 320–321, 317, 331, 335, 141/344, 301–302, 363–366, 349; 222/427, 452, 370, 142.9, 485, 548; 251/89.5, 143, 147–148, 149.2, 149.5, 251/152, 156, 208, 210–212; 137/599.02
See application file for complete search history.

(56) References Cited

U.S. PATENT DOCUMENTS

| | | | |
|---|---|---|---|
| 1,948,840 A * | 2/1934 | Biddle | F02D 9/00 137/601.01 |
| 1,956,101 A * | 4/1934 | Le Noir | F16K 5/0242 137/625.3 |
| 2,029,219 A | 1/1936 | Bourland | |
| 2,105,589 A | 1/1938 | Eades | |
| 2,878,829 A * | 3/1959 | Folmsbee | F16K 11/074 137/553 |
| 2,944,707 A * | 7/1960 | Steinmetz | B65D 47/265 222/254 |
| 3,177,908 A * | 4/1965 | Kaufman | B65D 5/76 141/321 |
| 3,180,376 A * | 4/1965 | Sanborn | B01J 4/001 137/584 |
| 3,225,963 A | 12/1965 | Arpajian | |
| 3,239,111 A | 3/1966 | La Croce | |
| 3,308,995 A | 3/1967 | Lee et al. | |
| 3,327,905 A | 6/1967 | Gould | |
| 3,773,221 A | 11/1973 | Lesk et al. | |
| 4,021,021 A | 5/1977 | Hall et al. | |
| 4,095,723 A | 6/1978 | Lerner | |
| 4,187,881 A * | 2/1980 | Kull | F16K 27/07 137/13 |
| 4,212,415 A | 6/1980 | Neely | |
| 4,274,563 A | 6/1981 | Otterson | |
| 4,304,273 A * | 12/1981 | Caudill | G03G 15/087 141/268 |
| 4,349,157 A | 9/1982 | Beiswenger et al. | |
| 4,366,920 A | 1/1983 | Greenfield, Jr. et al. | |
| 4,376,497 A | 3/1983 | Mumford | |
| 4,429,815 A | 2/1984 | Libit | |
| 4,548,331 A | 10/1985 | Montgomery | |
| 4,586,459 A | 5/1986 | Schultz | |
| 4,613,063 A | 9/1986 | Wright | |
| 4,828,130 A | 5/1989 | Hofmann | |
| RE33,083 E | 10/1989 | Pellegrino | |
| 4,892,233 A | 1/1990 | Zelickson | |
| 5,172,740 A | 12/1992 | Simmel et al. | |
| 5,261,432 A | 11/1993 | Sandrin | |
| 5,322,085 A | 6/1994 | Prothe | |
| 5,407,107 A | 4/1995 | Smith | |
| 5,495,962 A | 3/1996 | Nomura | |
| 5,513,776 A | 5/1996 | Canini | |
| 5,513,777 A * | 5/1996 | Yoda | B29C 45/18 222/325 |
| 5,582,162 A | 12/1996 | Petersson | |
| 5,601,213 A | 2/1997 | Daniello | |
| 5,609,458 A | 3/1997 | Hanaoka et al. | |
| 5,687,782 A | 11/1997 | Cleveland et al. | |
| 5,967,383 A | 10/1999 | Hidalgo | |
| 6,050,309 A | 4/2000 | Woodruff | |
| 6,085,809 A | 7/2000 | Woodruff | |
| 6,179,164 B1 | 1/2001 | Fuchs | |
| 6,193,116 B1 | 2/2001 | Sheffler et al. | |
| 6,257,172 B1 | 7/2001 | Leppanen | |
| 6,283,339 B1 | 9/2001 | Morrow | |
| 6,305,443 B1 | 10/2001 | Semenenko | |
| 6,311,745 B1 | 11/2001 | Welch et al. | |
| D479,801 S | 9/2003 | Carmichael et al. | |
| 6,886,719 B1 | 5/2005 | Shen et al. | |
| 6,988,642 B2 | 1/2006 | Gallo, Jr. et al. | |
| 7,073,546 B2 | 7/2006 | Woodruff | |
| 7,438,204 B2 | 10/2008 | Conway et al. | |
| 7,980,277 B2 | 7/2011 | Amano | |
| D677,987 S | 3/2013 | High | |
| 8,833,614 B2 | 9/2014 | Webster et al. | |
| 9,139,963 B2 | 9/2015 | Zwahlen et al. | |
| 9,810,363 B2 * | 11/2017 | Ganzer | B05C 11/1031 |
| 2002/0125275 A1 | 9/2002 | Smith | |
| 2002/0145010 A1 | 10/2002 | Ufheil et al. | |
| 2002/0145013 A1 | 10/2002 | Chrisman et al. | |
| 2003/0159751 A1 | 8/2003 | Chamba | |
| 2004/0079765 A1 | 4/2004 | Gallo, Jr. et al. | |
| 2005/0103337 A1 | 5/2005 | Hickey et al. | |
| 2005/0247742 A1 | 11/2005 | Livingston et al. | |
| 2005/0263373 A1 | 12/2005 | Boevers | |
| 2006/0027609 A1 | 2/2006 | Landau et al. | |
| 2006/0070999 A1 | 4/2006 | Stull et al. | |
| 2006/0191958 A1 | 8/2006 | Brundick | |
| 2006/0278665 A1 | 12/2006 | Bennett | |
| 2007/0034642 A1 | 2/2007 | Pendleton | |
| 2007/0084885 A1 | 4/2007 | Conway et al. | |
| 2007/0181600 A1 | 8/2007 | Ben-Shlomo et al. | |
| 2008/0054014 A1 | 3/2008 | Webster et al. | |
| 2008/0072993 A1 | 3/2008 | Luchinger et al. | |
| 2008/0093394 A1 | 4/2008 | Peterson et al. | |
| 2009/0127289 A1 | 5/2009 | Keller | |
| 2009/0145510 A1 | 6/2009 | Luechinger | |
| 2009/0188517 A1 | 7/2009 | Thorpe et al. | |
| 2009/0188518 A1 | 7/2009 | Thorpe et al. | |
| 2009/0258547 A1 | 10/2009 | Pardikes | |
| 2009/0309006 A1 | 12/2009 | Johnsgaard | |
| 2010/0012120 A1 | 1/2010 | Herder et al. | |
| 2010/0204441 A1 | 8/2010 | Pardikes | |
| 2011/0099950 A1 | 5/2011 | Dunn et al. | |
| 2011/0101023 A1 | 5/2011 | Chan et al. | |
| 2012/0080457 A1 | 4/2012 | Lovinger et al. | |
| 2012/0267401 A1 | 10/2012 | Schroedter | |
| 2013/0167972 A1 | 7/2013 | Peressoni | |
| 2014/0103153 A1 | 4/2014 | Below | |
| 2014/0166439 A1 | 6/2014 | Hughes | |
| 2014/0230963 A1 | 8/2014 | Simon et al. | |
| 2015/0021364 A1 | 1/2015 | Zehnder et al. | |

FOREIGN PATENT DOCUMENTS

| | | | | |
|---|---|---|---|---|
| AU | 2005204344 A1 | 4/2006 | | |
| CA | 1082475 A | 7/1980 | | |
| CA | 1113734 A | 12/1981 | | |
| CA | 1254172 A | 5/1989 | | |
| CA | 1306979 C | 9/1992 | | |
| CA | 2152088 A1 | 7/1994 | | |
| CA | 2012098 C | 11/1994 | | |
| CA | 2237351 A1 | 11/1998 | | |
| CA | 2152088 C | 12/1999 | | |
| CN | 200981706 Y | 11/2007 | | |
| CN | 200985145 Y | 12/2007 | | |
| CN | 201686132 U | 12/2010 | | |
| CN | 202193332 U | 4/2012 | | |
| CN | 102923390 A | 2/2013 | | |
| CN | 204471651 U | 7/2015 | | |
| DE | 10009089 A1 * | 12/2001 | ............. | F16K 3/085 |
| EP | 0115321 A2 | 8/1984 | | |
| EP | 0664667 B1 | 3/1998 | | |
| EP | 0923993 A1 | 6/1999 | | |
| EP | 1500911 A1 | 1/2005 | | |
| EP | 1902956 A1 | 3/2008 | | |
| EP | 2447186 B1 | 5/2012 | | |
| EP | 2632302 B2 | 7/2014 | | |
| GB | 2295609 A | 6/1996 | | |
| GB | 2296711 A | 7/1996 | | |
| GB | 2328926 A | 3/1999 | | |
| GB | 2421296 A * | 6/2006 | ........... | B65D 47/265 |
| GB | 2448236 A | 10/2008 | | |
| GB | 2457110 A | 8/2009 | | |
| GB | 2457111 A | 8/2009 | | |

(56) References Cited

FOREIGN PATENT DOCUMENTS

| | | | |
|---|---|---|---|
| GB | 2489721 A | 10/2012 | |
| JP | H03-216697 A | 9/1991 | |
| JP | 4206175 B2 | 1/2009 | |
| NZ | 20060544807 | 11/2007 | |
| WO | WO 85/00156 A1 | 1/1985 | |
| WO | WO 88/07324 A1 | 10/1988 | |
| WO | WO 88/08269 A1 | 11/1988 | |
| WO | WO 95/15893 A1 | 6/1995 | |
| WO | WO 96/04410 A1 | 2/1996 | |
| WO | WO 97/30743 A1 | 8/1997 | |
| WO | WO 99/44663 A1 | 9/1999 | |
| WO | WO 03/093773 A1 | 11/2003 | |
| WO | WO 2004/041435 A2 | 5/2004 | |
| WO | WO 2006/119324 A2 | 11/2006 | |
| WO | WO 2007/120133 A2 | 10/2007 | |
| WO | WO 2007/141601 A1 | 12/2007 | |
| WO | WO 2009/050710 A2 | 4/2009 | |
| WO | WO 2010/150087 A1 | 12/2010 | |
| WO | WO-2011020664 A2 * | 2/2011 | ........... F01D 17/145 |
| WO | WO 2013/010702 A1 | 1/2013 | |
| WO | WO 2014/031474 A2 | 2/2014 | |
| WO | WO 2015/158724 A1 | 10/2015 | |
| WO | WO 2016/016649 A1 | 2/2016 | |
| WO | WO 2016/019299 A1 | 2/2016 | |
| WO | WO 2018/093992 A1 | 5/2018 | |
| WO | WO 2018/093995 A1 | 5/2018 | |

OTHER PUBLICATIONS

European Patent Office, Written Opinion in International Patent Application No. PCT/US2017/061934, 13 pp. (dated Apr. 30, 2018).

* cited by examiner

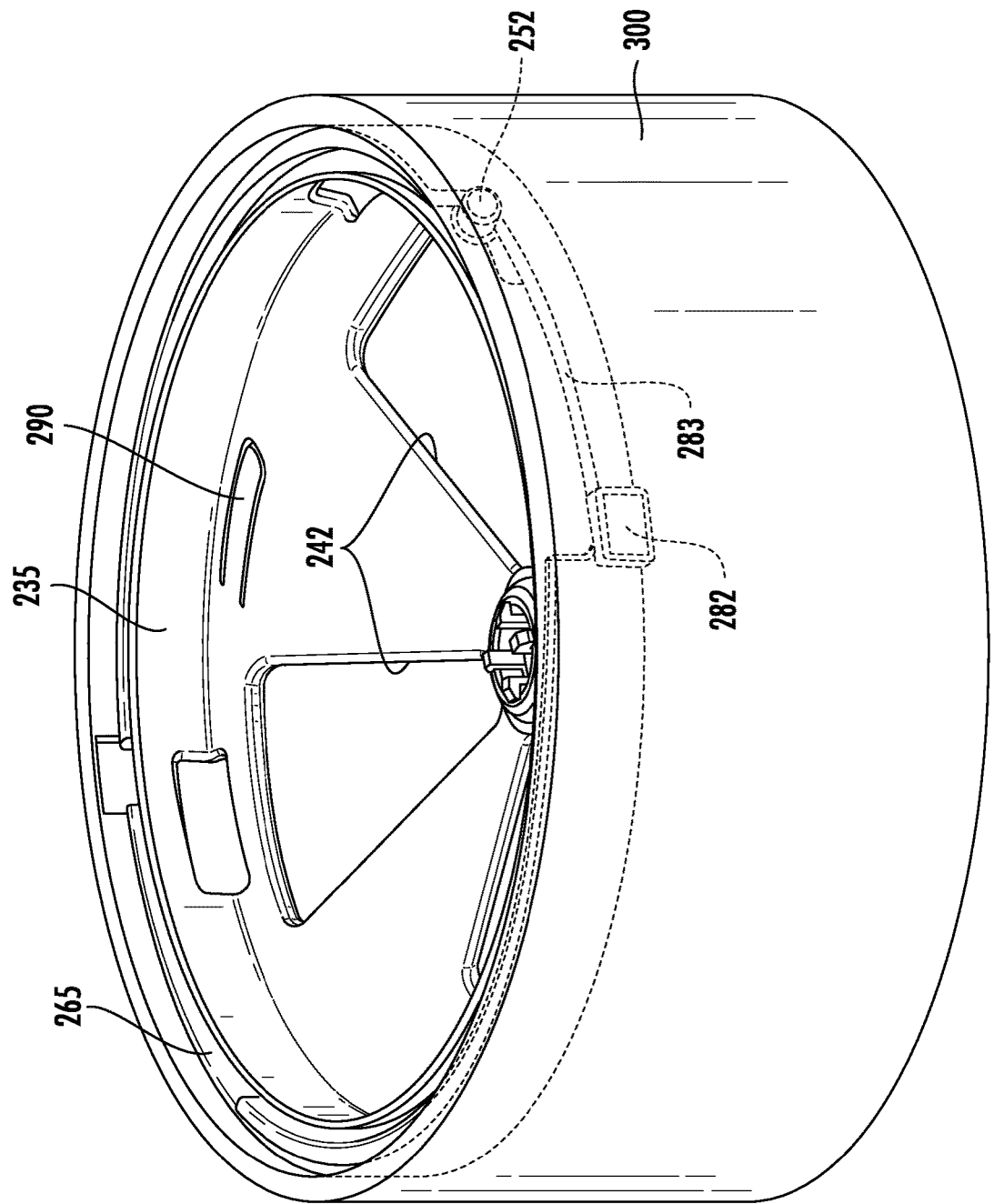

MATERIAL SUPPLY SYSTEM WITH VALVE ASSEMBLY

This application is a nonprovisional application claiming the benefit of U.S. Provisional Patent Application Ser. No. 62/424,795, filed Nov. 21, 2016, the disclosure of which is incorporated herein by reference in its entirety.

TECHNICAL FIELD

The present disclosure relates generally to valve systems and, more particularly, to valve assembly mountable on a base to control the flow of material or substances through the valve assembly and the base.

BACKGROUND

Valve systems are used to control the flow of powdered or granular materials from sealed containers within closed loop material feed systems. Such valve systems may include first and second components that are rotatable relative to each other to open and close a valve assembly. While existing valve systems may perform well under some conditions, operation may be challenging depending upon the characteristics of the materials or substances within the containers. Accordingly, an improved valve system for use with a variety of materials or substances would be desirable.

SUMMARY

A material supply assembly with improved sealing capabilities is provided. The material supply assembly comprises a valve assembly and a base. The valve assembly includes an outer valve member and an inner valve member. The outer valve member includes an annular outer body section and an outer discharge section, with the outer discharge section having a plurality of first openings therein. The inner valve member includes an annular inner body section and an inner discharge section, with the inner discharge section having a plurality of second openings therein. The inner valve member is rotatably disposed on the outer valve member and rotatable relative to the outer valve member between a closed position at which the valve assembly is closed and an open position at which the valve assembly is open. At the open position, the plurality of first openings are aligned with the plurality of second openings. A plurality of discharge seals are operative between the outer valve member and the inner valve member, with one of the discharge seals extending around each of the first openings of the outer valve member or each of the second openings of the inner valve member to provide a seal between the outer valve member and the inner valve member. A first circumferential seal is operative between the outer and inner valve members, with the first circumferential seal providing a seal between the outer valve member and the inner valve member. The base has a receptacle with an inlet and an outlet. The inlet is configured to receive at least a portion of the valve assembly therein and the outlet is configured to pass material therethrough.

A material supply assembly with improved operating characteristics is provided. The material supply assembly comprises a valve assembly, a base, and an engagement structure between the valve assembly and the base. The valve assembly includes an outer valve member and an inner valve member. The outer valve member includes an annular outer body section and an outer discharge section, with the outer discharge section including a plurality of first openings therein. The inner valve member includes an annular inner body section and an inner discharge section, with the inner discharge section including a plurality of second openings therein. The inner valve member is rotatably disposed on the outer valve member and rotatable relative to the outer valve member between a closed position at which the valve assembly is closed and an open position at which the valve assembly is open. At the open position, the plurality of first openings are aligned with the plurality of second openings. A base has a receptacle with an inlet and an outlet. The inlet is configured to receive at least a portion of the valve assembly therein and the outlet is configured to pass material therethrough. An engagement structure is operative between the valve assembly and the base. The engagement structure includes a plurality of spaced apart vertical engagement projections on one of the valve assembly and base member and a plurality of complementary configured engagement recesses on another of the valve assembly and base member, with each vertical engagement projection being configured to be received in one of the engagement recesses.

A material supply assembly with a locking member is provided. The material supply assembly comprises a valve assembly, a base and a projection. The valve assembly includes an outer valve member and an inner valve member. The outer valve member includes an annular outer body section, an outer discharge section, and a locking receptacle, with the outer discharge section including a plurality of first openings therein. The inner valve member includes an annular inner body section, an inner discharge section, and a flexible locking arm, with the inner discharge section including a plurality of second openings therein. The flexible locking arm has a locking member configured to be received in the locking receptacle of the outer valve member and is movable between a first locked position and a second unlocked position. The inner valve member is rotatably disposed on the outer valve member and rotatable relative to the outer valve member between a closed position at which the valve assembly is closed and an open position at which the valve assembly is open. At the first locked position, the locking member engages the locking receptacle to prevent rotation of the inner valve member relative to the outer valve member from the closed position, and at the second unlocked position, the locking member is spaced from the locking receptacle to permit rotation of the inner valve member relative to the outer valve member from the closed position to the open position. The base has a receptacle with an inlet and an outlet. The inlet is configured to receive at least a portion of the valve assembly therein and the outlet is configured to pass material therethrough. The projection is configured to engage the flexible locking arm to move the locking arm from the first locked position to the second unlocked position.

BRIEF DESCRIPTION OF THE DRAWINGS

FIG. 23 is an enlarged perspective view of the valve assembly and base of FIG. 22.

DETAILED DESCRIPTION

Figure 1:
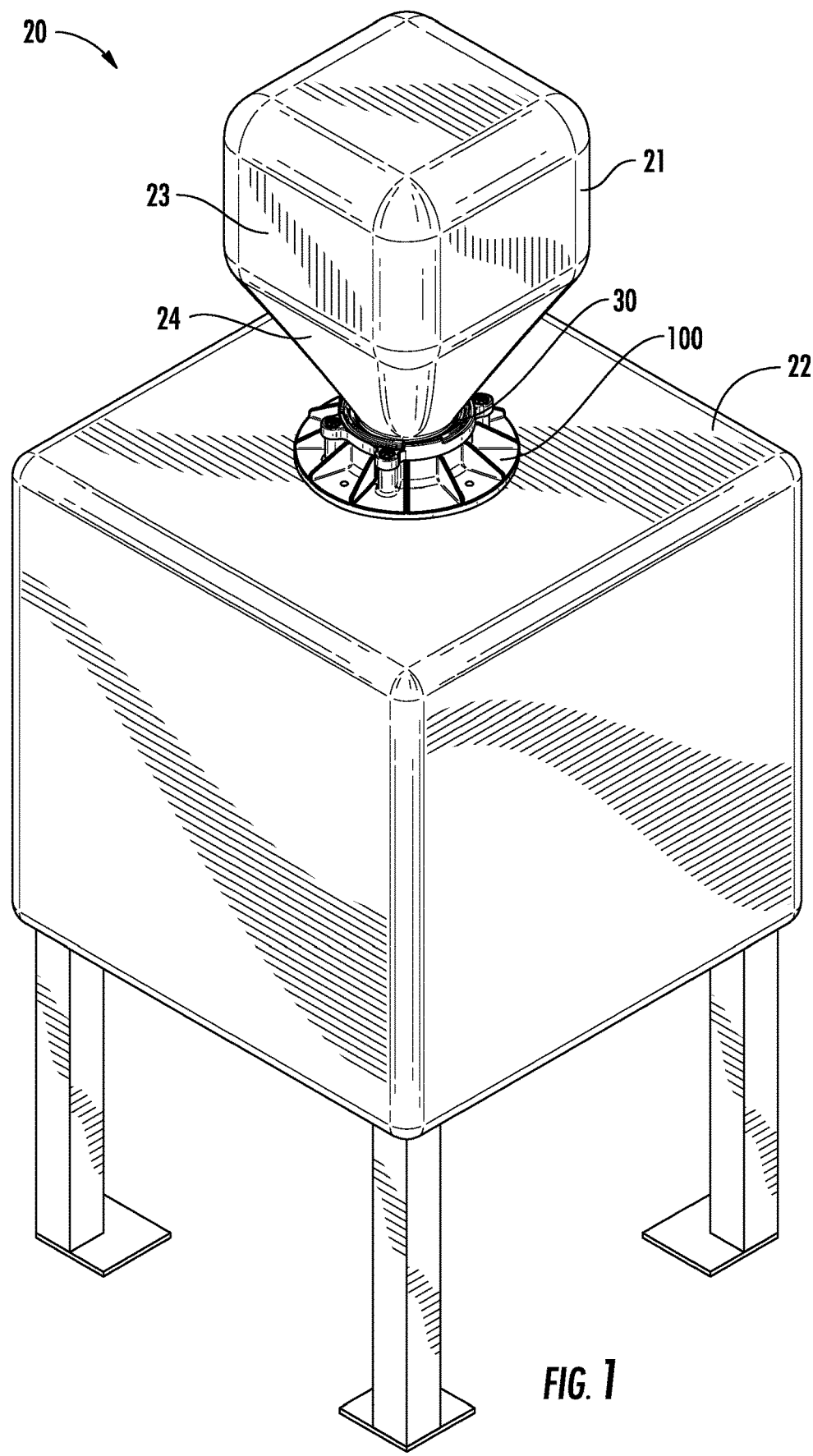
FIG. 1 is a perspective view of a product supply system in accordance with the principles of the present disclosure.
Figure 2:
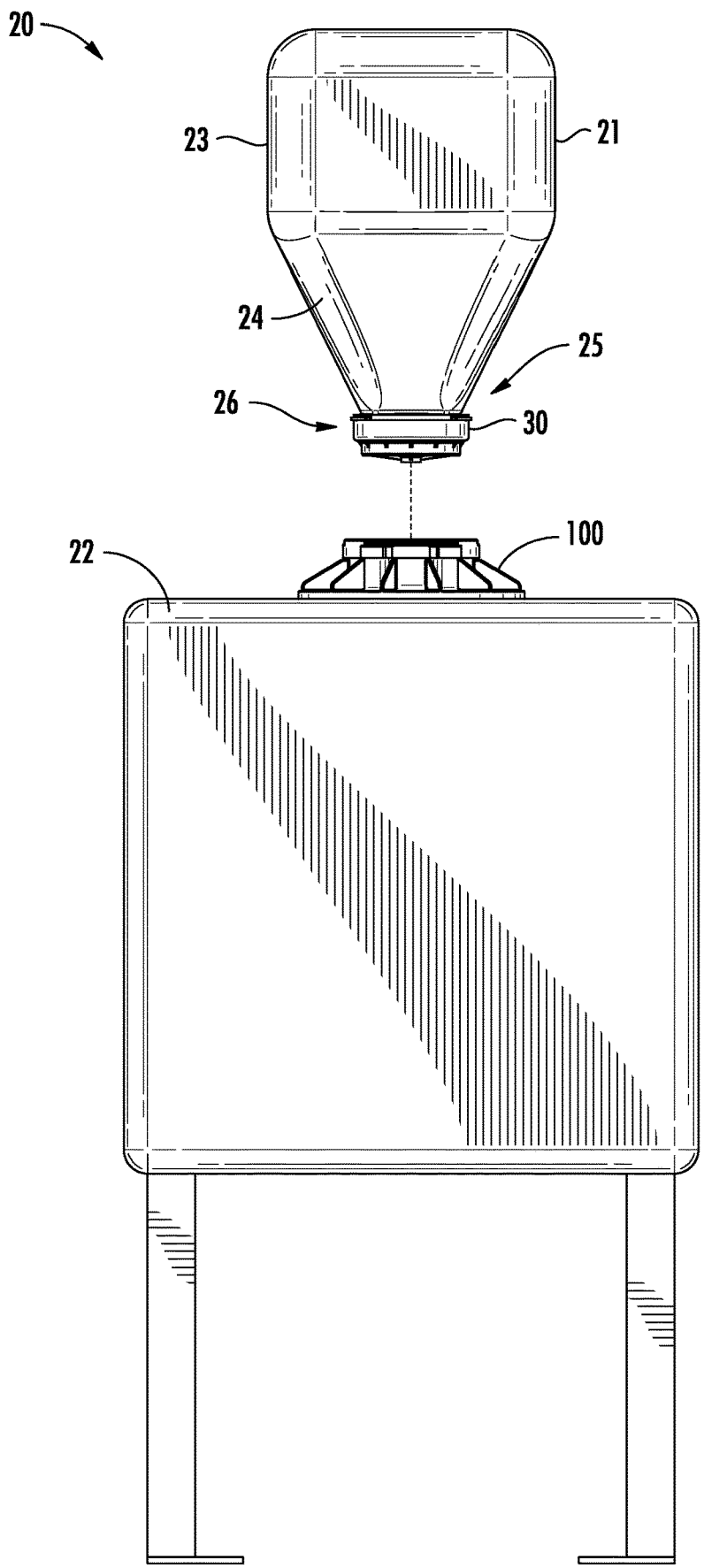
FIG. 2 is a side view of the product supply system of FIG. 1.

Referring to FIG. 1, a material supply system 20 includes a container 21 secured to a fitment or valve assembly 30 and a docking station or base 100 mounted on a feed mechanism 22. The valve assembly 30 may be removably secured to the base 100 to form a valve system that is part of closed loop material feed system. The container 21 may have any desired configuration and, as depicted, may include a closed body section 23 and a tapered section 24. A lower portion 25 (FIG. 2) of the container 21 includes an opening (not shown) through which material within the body section 23 may be discharged. The lower portion 25 of the container 21 includes a mounting section 26 for securing the container 21 to the valve assembly 30. The mounting section 26 may be secured to the valve assembly 30 in any desired manner. In one embodiment, the mounting section 26 may include a plurality of threads (not shown) for threadingly engaging threads 37 on the valve assembly 30. In another embodiment, the mounting section 26 may be secured to the valve assembly 30 with an adhesive. In still another embodiment, the mounting section 26 and the valve assembly 30 may have a structure (not shown) to snap-fit the mounting section into the valve assembly.

Figure 6:
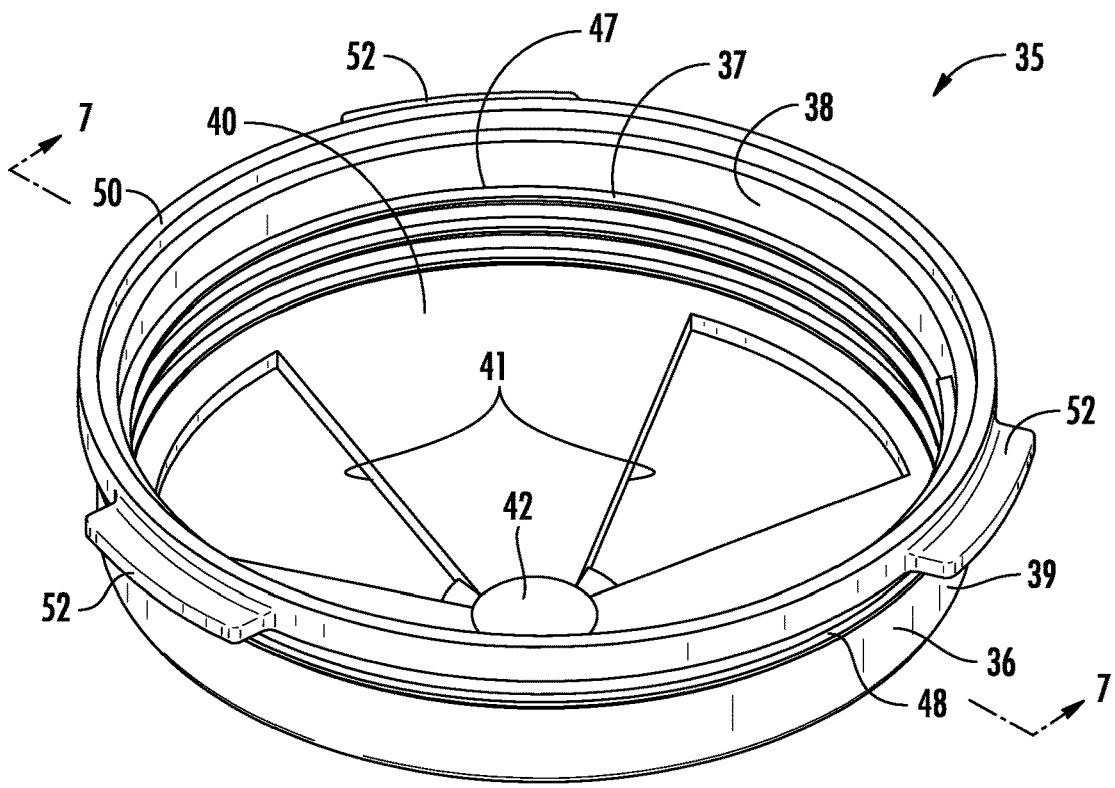
FIG. 6 is a perspective view of an inner valve member of the valve assembly.
Figure 7:
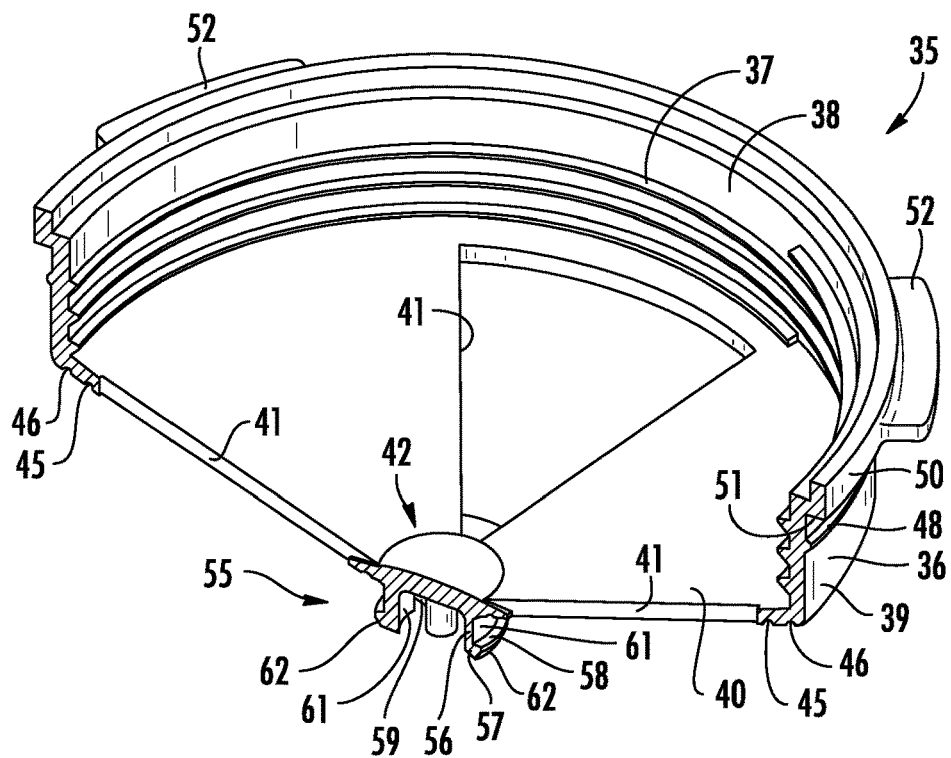
FIG. 7 is a sectional view taken generally along line 7-7 in FIG. 6.
Figure 8:
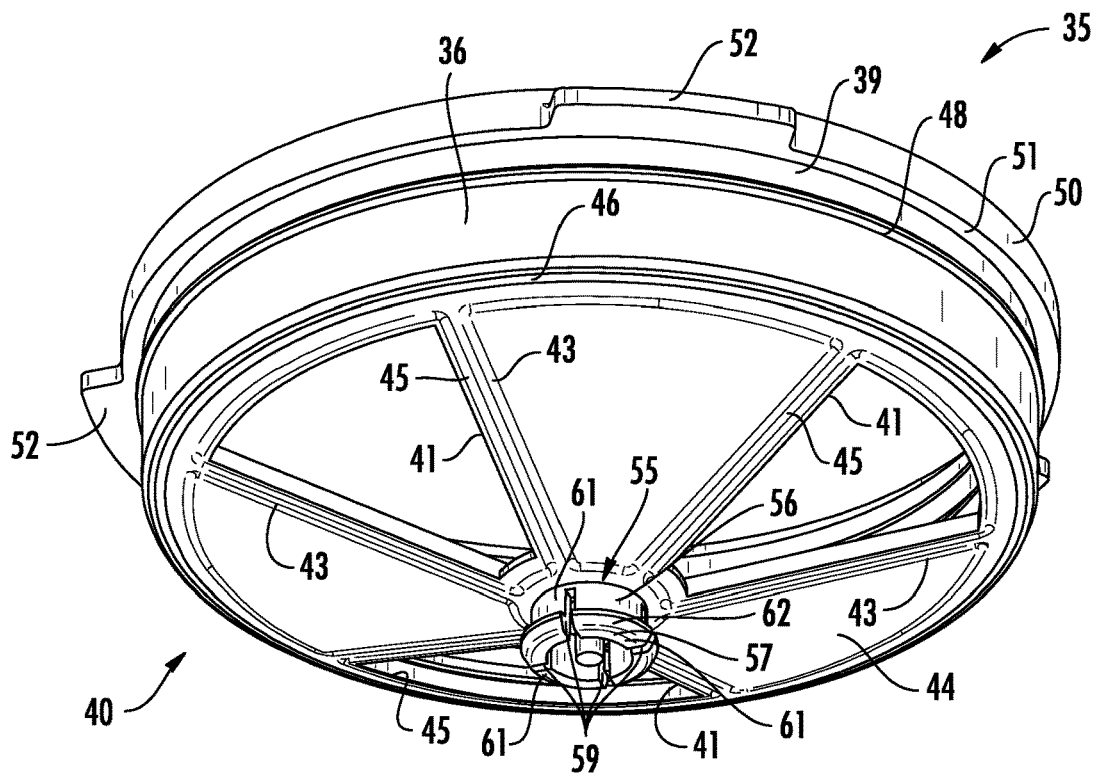
FIG. 8 is a perspective view of the inner valve member of FIG. 6 but taken from a perspective below the inner valve member.

The valve assembly 30 includes an inner valve member 35 that is rotatably mounted on and within outer valve member 65. Referring to FIGS. 6-8, the inner valve member 35 has an annular body section 36 with a tapered lower discharge section 40. The annular body section 36 may include threads 37 on an inner surface 38 thereof configured to sealingly engage the threads on the mounting section 26 of container 21. In an embodiment in which the container 21 is secured to the inner valve member 35 without threads, the inner surface 38 of the annular body section 36 may be smooth or have another configuration to assist in sealingly engaging the mounting section 26 of the container 21. The inner surface 38 may also include one or more annular grooves (not shown) to receive adhesive and/or an O-ring therein.

The discharge section 40 includes a plurality of openings 41 that extend generally from the body section 36 to the center section 42 of the inner valve member 35. Although depicted with three generally triangularly-shaped openings 41 that are evenly spaced apart, the lower discharge section 40 may include any number and configuration of openings provided that they permit the desired flow rate from the container 21 through the valve assembly 30. In an additional embodiment, the number of openings 41 may be approximately five. In still another embodiment, the number of openings 41 may be approximately ten or more.

In order to seal the valve assembly 30, a sealing channel or recess 43 (FIG. 8), which forms half of a seal assembly associated with the each opening 71 in outer valve member 65, may extend into the lower surface 44 of the discharge section 40 and in a shape that generally conforms to the shape of each opening 41. As depicted, sealing channels 43 are generally triangularly-shaped and generally match the shape of openings 41. In addition, a locking channel or recess 45 that is identical or similar to sealing channel 43 may extend into the lower surface 44 of the discharge section 40 and generally surrounds or encircles each opening 41.

To provide additional sealing capabilities, an additional annular sealing channel or recess 46, which forms half of a circumferential seal assembly, may extend into the lower surface 44 of the discharge section 40 generally adjacent the intersection 47 of the body section 36 and the discharge section.

Still another or alternate circumferential seal may be provided around the annular body section 36, if desired. For example, an annular upper seal projection 48, which forms half of a second circumferential seal assembly positioned to encircle the annular body section 36, may extend around the outer surface 39 of the annular body section generally adjacent the intersection 47 of the body section and the discharge section.

The upper portion of annular body section 36 may be configured as an enlarged annular portion 50 having an outer diameter greater than that of outer surface 39 of the main portion of the annular body section to define a lower or downwardly facing edge 51. A plurality of annular projections or operating tabs 52 may extend radially outward from the enlarged annular portion 50. As depicted, the inner valve member 35 includes three equally spaced operating tabs 52 but any number of tabs may be used.

A retention section 55 may extend downwardly from the center section 42 of the discharge section 40. The retention section 55 includes an annular axle section 56 about which the outer valve member 65 may rotate. An annular section 57 at the lower end of annular axle section 56 has a greater diameter than the annular axle section to define a locking shoulder 58. The annular axle section 56 and the annular section 57 include slots 59 that extend from the lower surface 60 of the annular section 57 towards the center section 42 of discharge section 40 so that the retention section 55 defines four flexible or deflectable arms 61. The annular section 57 includes a tapered lower surface 62 to facilitate deflection of the arms 61 while mounting the outer valve member 65 onto the retention section 50.

Figure 9:
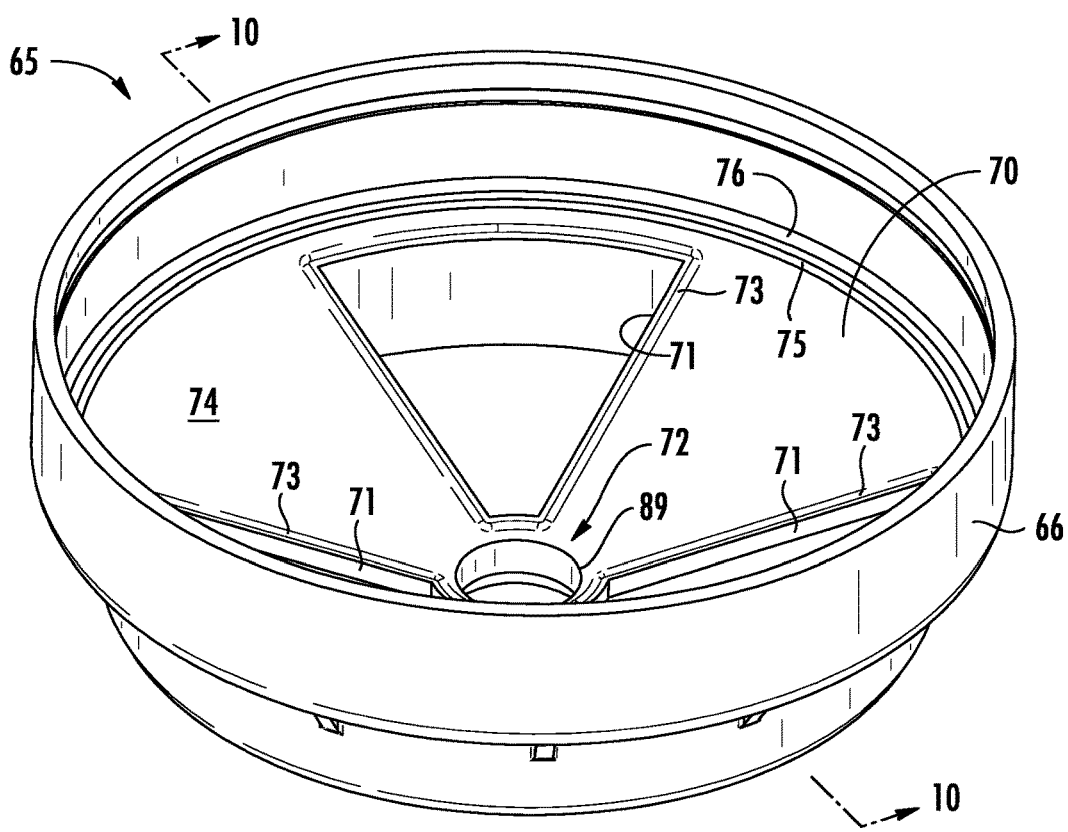
FIG. 9 is a perspective view of an outer valve member of the valve assembly.
Figure 10:
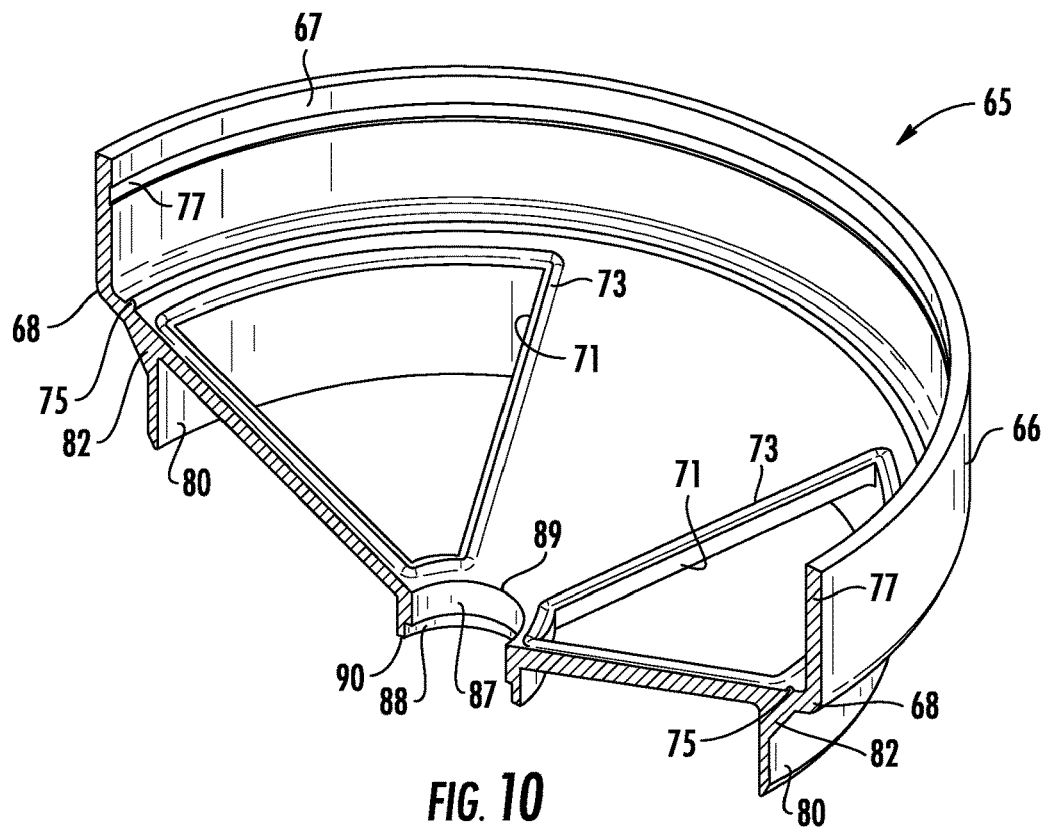
FIG. 10 is a sectional view taken generally along line 10-10 in FIG. 9.
Figure 11:
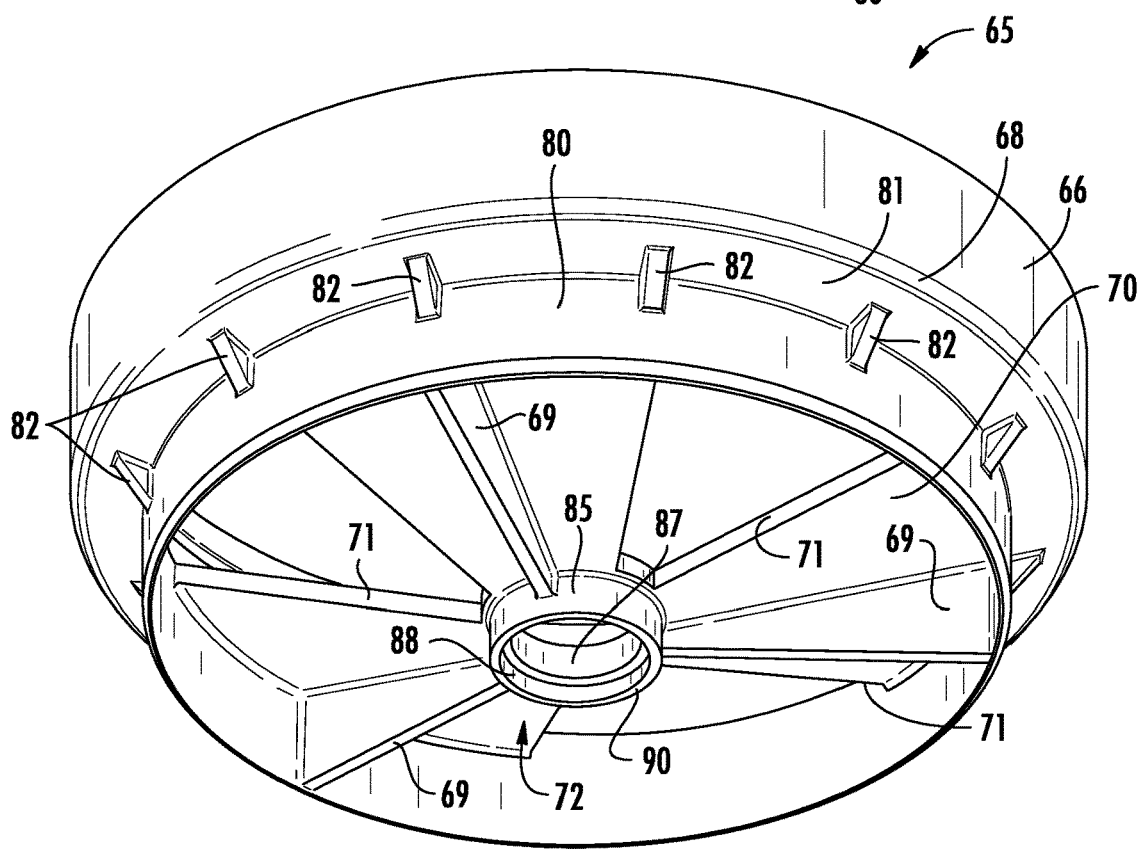
FIG. 11 is a perspective view of the outer valve member of FIG. 9 but taken from a perspective below the outer valve member.
Figure 13:
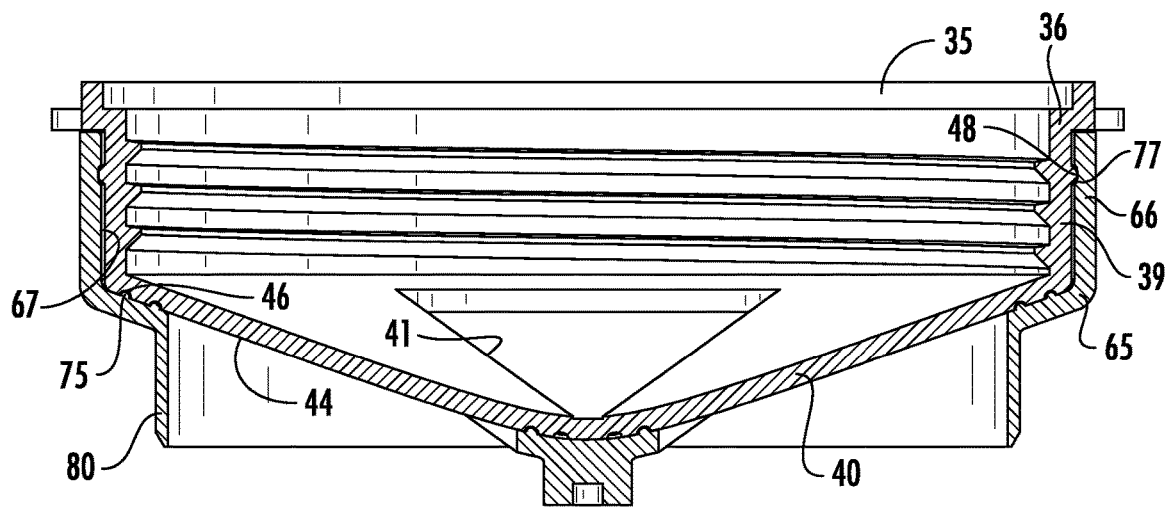
FIG. 13 is a sectional view similar to FIG. 12 but with the inner valve member fully inserted into the outer valve member.

Referring to FIGS. 9-11, the outer valve member 65 is configured to receive the inner valve member 35 therein. Outer valve member 65 has an annular body section 66 with a tapered lower discharge section 70. The annular body section 66 is dimensioned to receive the annular body section 36 of inner valve member 35 in a closely spaced relationship and the discharge section 70 is dimensioned to receive the discharge section 40 of the inner valve member 35 in a closely spaced relationship (FIG. 13).

The discharge section 70 includes a plurality of openings 71 that extend generally from the body section 66 to the center section 72 of the outer valve member 65. The openings 71 may be identical in number and in size to the openings 41 in the inner valve member 35. Accordingly, as depicted, the discharge section 70 includes three generally triangularly-shaped openings 71.

In order to seal the openings 71, a projection 73 surrounding each opening 71 may extend upward from the upper surface 74 of the discharge section 70 in a configuration (e.g., shape and size) that is identical to or closely matches the sealing channel 43 in the lower surface 44 of discharge section 40 of inner valve member 35. Upon positioning the projection 73 within channel 43, the projection interacts with the channel to form a seal assembly that seals the opening 71 and prevent material within the container 21 from passing through the valve assembly 30.

In addition to interacting with the sealing channels 43 to seal the openings 71, the projections 73 may also interact with the locking channels 45 that surround the openings 41 in inner valve member 35. In one aspect, the interaction between the locking channels 45 and the projections 73 assists in maintaining the valve assembly 30 in an open position (i.e., with the openings 41 in the inner valve member and the opening 71 in the outer valve member 65 aligned). In another aspect, the interaction between the locking channels 45 and the projections 73 provide tactile feedback as to when the valve assembly has reached its fully open position. In an alternate embodiment, other structures such as projections and channels of other configurations may be provided between the inner valve member 35 and the outer valve member 65 to provide the locking and/or tactile feedback functionality.

An annular sealing projection 75 may extend from the upper surface 74 of the discharge section 70 generally adjacent the intersection 76 of the body section 66 and the discharge section. The sealing projection 75 has a configuration that is identical to or closely matches that of the annular channel 46 in the lower surface 44 of discharge section 40 of inner valve member 35. The sealing projection 75 is positioned so as to be aligned with channel 46 of inner valve member 35 upon positioning the inner valve member within the outer valve member 65. Upon positioning the projection 75 within the channel 46, the projection interacts with the channel to provide a circumferential seal structure or assembly to prevent or reduce the likelihood that material from the container 21 will pass through the valve assembly 30 or escape from the closed loop material feed system.

An annular upper seal channel or recess 77 may extend within the inner surface 67 of the body section 66. The upper seal channel 77 may have a configuration that is identical to or closely matches that of the annular upper seal projection 48 of the annular body section 36 of inner valve member 35. The upper seal channel 77 is positioned so as to be aligned with upper seal projection 48 of inner valve member 35 upon positioning the inner valve member within the outer valve member 65. Upon positioning the upper seal projection 48 within the upper seal channel 77, the projection interacts with the channel to provide an additional circumferential seal structure or assembly to prevent or reduce the likelihood that material from the container 21 will pass through the valve assembly or escape from the closed loop material feed system.

Although described with each projection having a configuration that is identical to or closely matches the recess into which it is positioned, in some instances, the projections and recesses may have different configurations in order to optimize their sealing function.

The lower portion of the outer valve member 65 includes an outer annular alignment ring 80 extending downwardly from the discharge section 70 that is centered about center section 72. A portion of the lower surface of discharge section 70 forms a lower angled or tapered mounting surface 81 that extends from a lower edge 68 of the body section 66 to the alignment ring 80. Although depicted with an angled surface that angles downward towards the center of the outer valve member 65, in another embodiment, the alignment surface 81 may be generally horizontal rather than angled downward towards the alignment ring 80. A plurality of downwardly projecting engagement tabs or projections 82 extend between the body section 66 and the alignment ring 80 from the lower angled mounting surface 81. In one embodiment, the engagement tabs 82 may be equally spaced apart.

The lower portion of the outer valve member 65 further includes an inner annular ring 85 centered about center section 72. The inner annular ring 85 is configured to receive therein the retention section 55 of inner valve member 35 to define a securement structure that secures the inner valve member and the outer valve member 65 together. More specifically, inner annular ring 85 has a stepped inner diameter with upper inner section 87 and a lower inner section 88. The upper inner section 87 has a diameter that is smaller than that of the lower inner section 88. The diameter of upper inner section 87 is larger than the diameter of the annular axle section 56 of retention section 55 and smaller than the diameter of the annular section 57. The diameter of lower inner section 88 is greater than the diameter of the annular section 57. The annular axle section 56 of retention section 55 and upper inner section 87 are configured to permit the inner valve member 35 to rotate relative to the outer valve member 65.

The annular section 57 and the slots 59 in the annular axle section 56 are configured to permit the annular section 57 and the arms 61 to pass through the upper inner section 87 during assembly of the valve assembly 30 and spring back with the annular section 57 positioned within the lower inner section 88.

A plurality of support webs or gussets 69 may extend along the lower surface of discharge section 70 between the alignment ring 80 and the inner annular ring 85.

Figure 12:
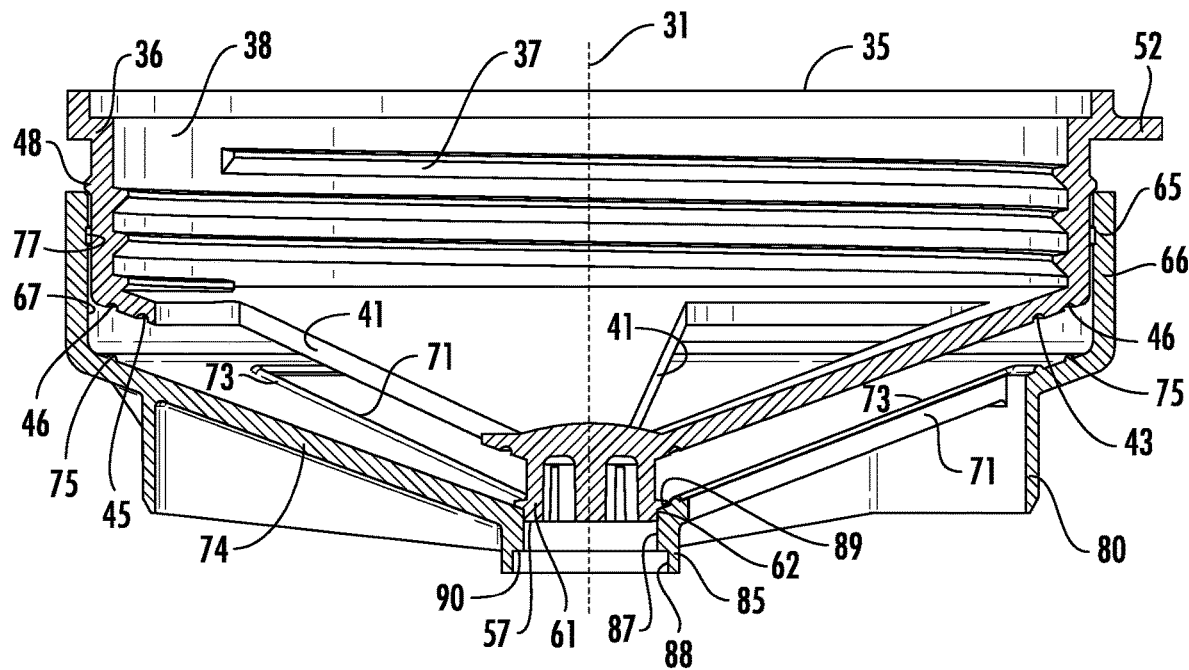
FIG. 12 is a sectional view of the valve assembly with the inner valve member partially inserted into the outer valve member.

To assemble valve assembly 30, inner valve member 35 and outer valve member 65 are aligned along a central axis 31 as depicted in FIG. 12. Inner valve member 35 is then moved relatively towards the outer valve member 65. In doing so, the discharge section 40 of inner valve member 35 passes through the annular body section 66 of outer valve member 65. As the inner valve member 35 continues to be moved towards the outer valve member 65, the annular body section 36 of the inner valve member enters annular body section 66 of the outer valve member with the outer surface 39 of the annular body section 36 being adjacent the inner surface 67 of the annular body section 66 (FIG. 13).

Continued relative movement results in the tapered lower surface 62 of the annular section 57 engaging the upper edge 89 of the inner annular ring 85. Further movement between the inner valve member 35 and the outer valve member 65 results in deflection of the flexible arms 61 so that the annular section 57 passes through the upper inner section 87. Once the annular section 57 reaches the lower inner section 88, the flexible arms 61 spring back to their undeflected positions with the locking shoulder 58 of the retention section 55 engaging the locking surface 90 defined by lower surface of the upper inner section 87.

As the inner valve member 35 and the outer valve member 65 are moved to their fully assembled positions depicted in FIG. 13, the sealing projection 75 along the upper surface 74 of lower surface 70 of the upper valve member engages the annular channel 46 in the lower surface 44 of discharge section 40 of the inner valve member. In addition, the annular upper seal projection 48 of the annular body section 36 of inner valve member 35 engages the annular upper seal channel 77 in the inner surface 67 of the body section 66. The inner valve member 35 may be rotated relative to the outer valve member 65 to the closed position so that each projection 73 extending upward from the upper surface 74 of the discharge section 70 and surrounding an opening 71 is aligned with one of the sealing channels 43 in the lower surface 44 of discharge section 40 of inner valve member 35 to seal the openings 71 and prevent material within the container 21 from passing through the valve assembly 30.

Although depicted with channels 43 extending into the inner valve member 35 and projections 73 extending from the outer valve member 65, annular recess 46 extending into the inner valve member 35 and annular sealing projection 75 extending from the outer valve member 65, and upper seal projection 48 extending from the inner valve member 35 and annular channel 77 extending into the outer valve member 65, the location of the structures forming each seal may be reversed, if desired. In some instances, it may be desirable for the projections 73 to extend upward from the outer valve member 65 to reduce the likelihood that material from package 21 will fill their complimentary recesses.

Figure 3:
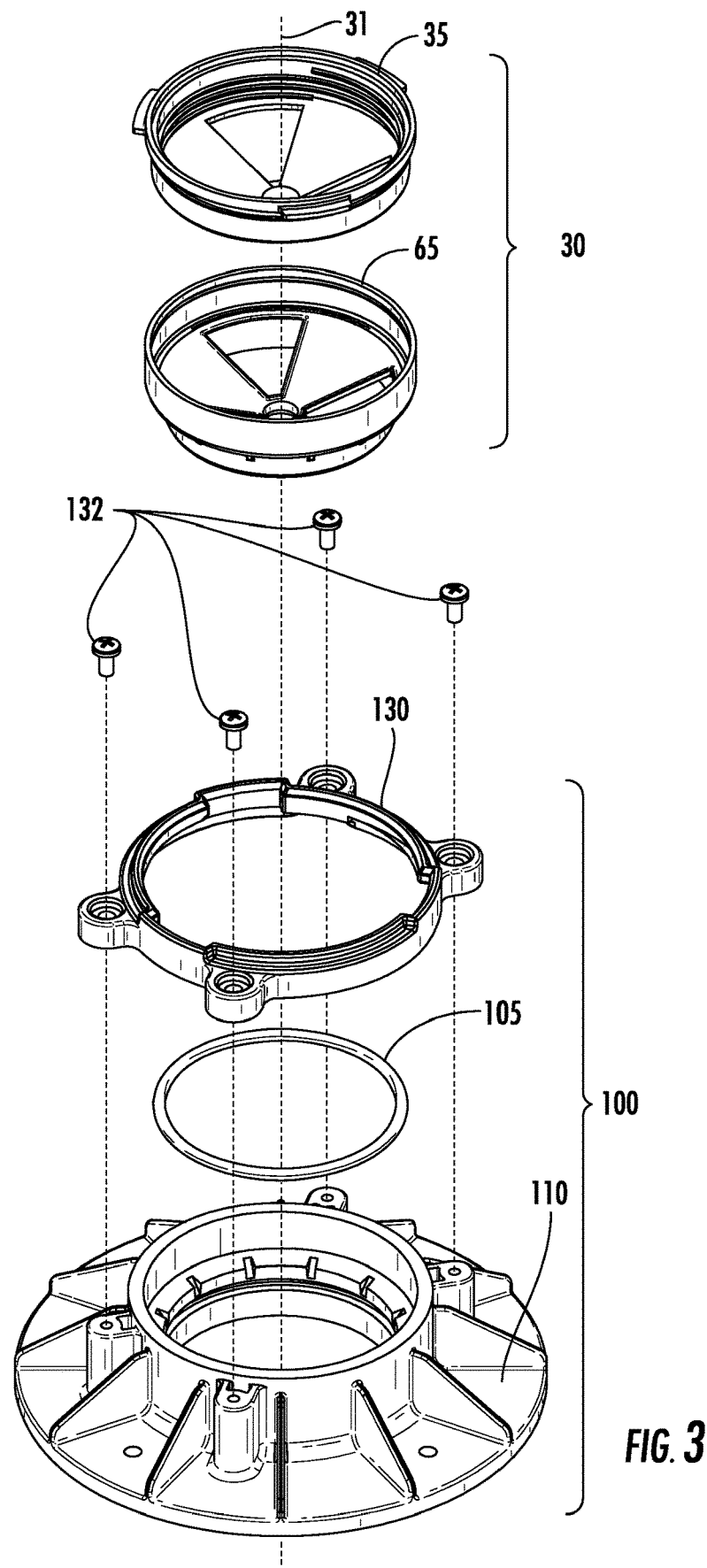
FIG. 3 is an exploded perspective view of a valve assembly and a base of FIG. 1.
Figure 4:
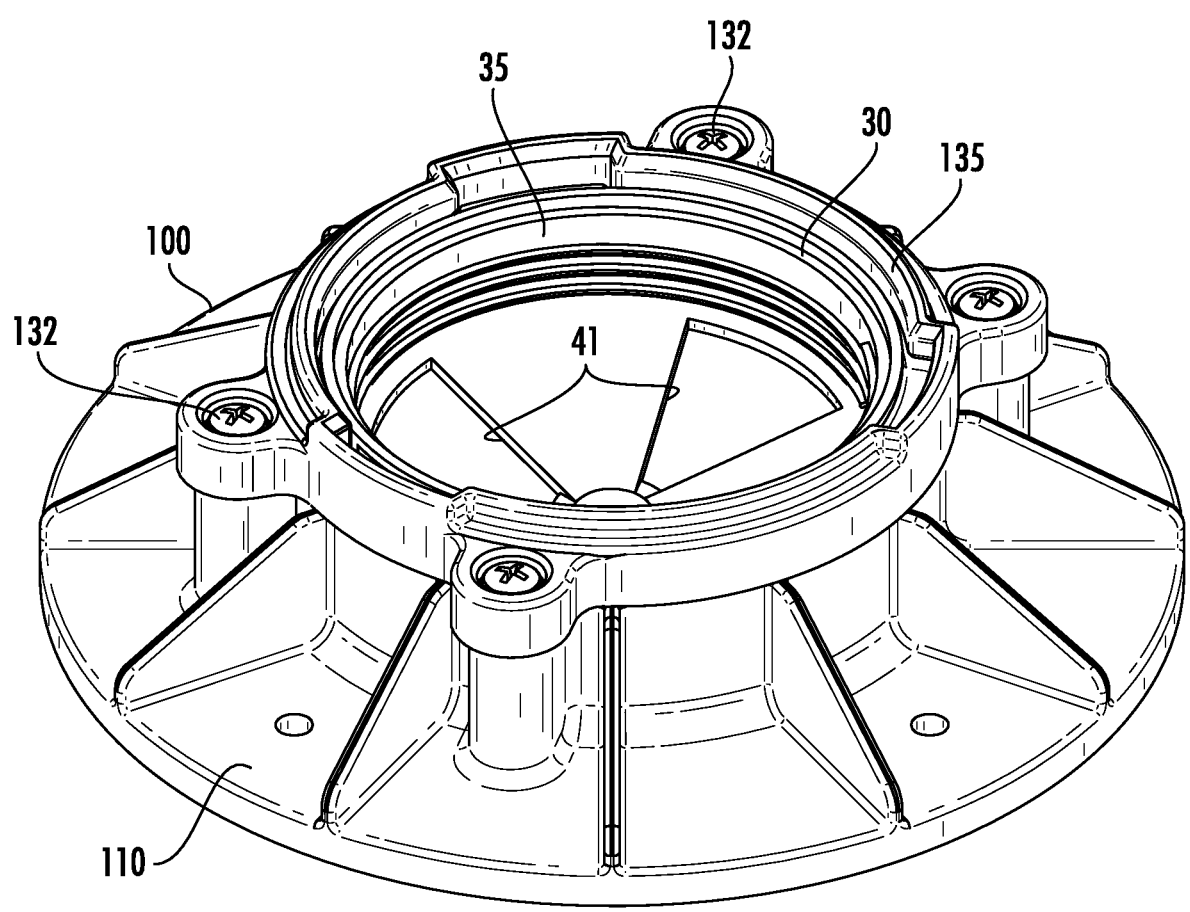
FIG. 4 is a perspective view of the valve assembly inserted into the base.
Figure 5:
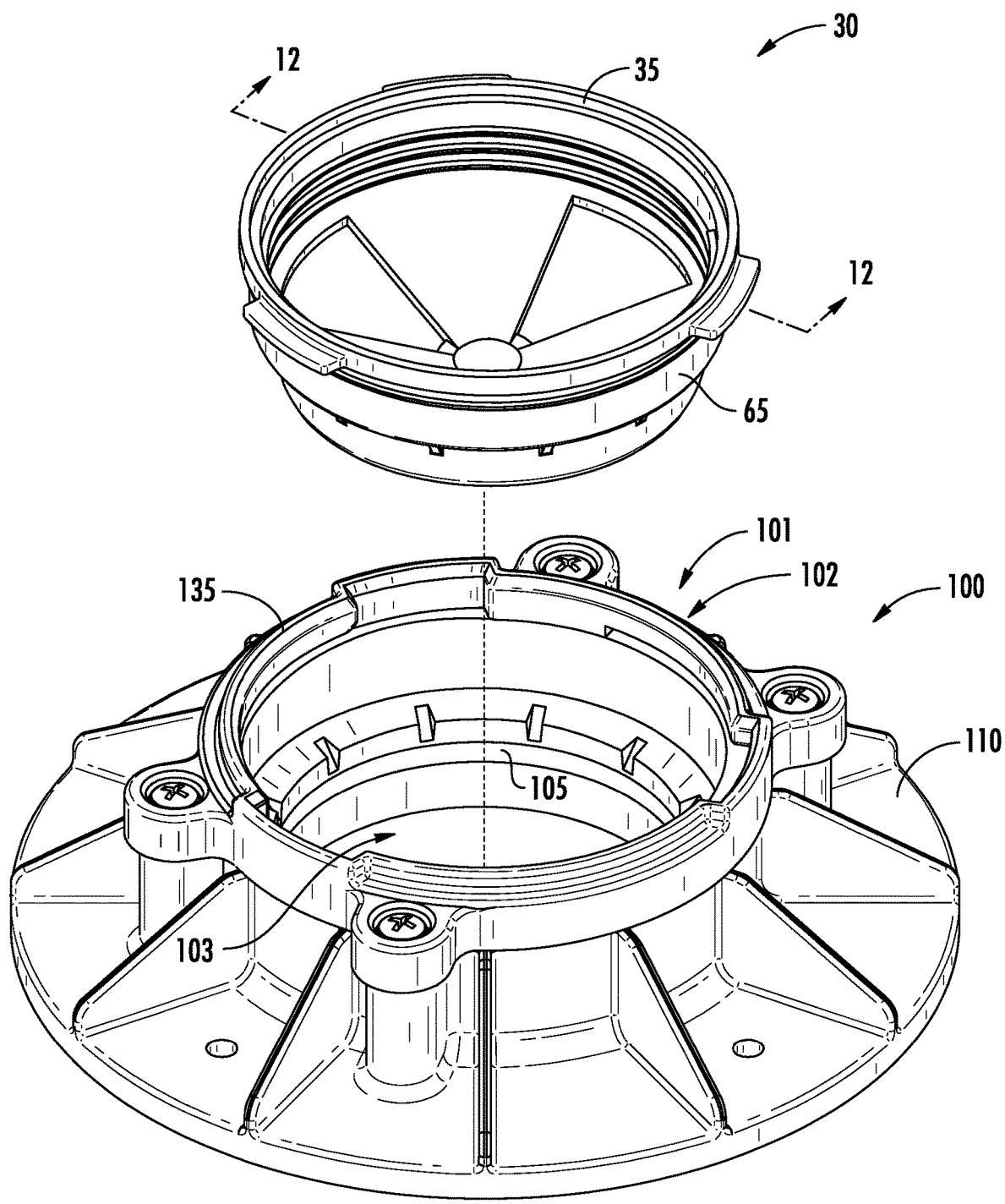
FIG. 5 is a perspective view of the valve assembly and base of FIG. 1 prior to insertion of the valve assembly into the base.
Figure 14:
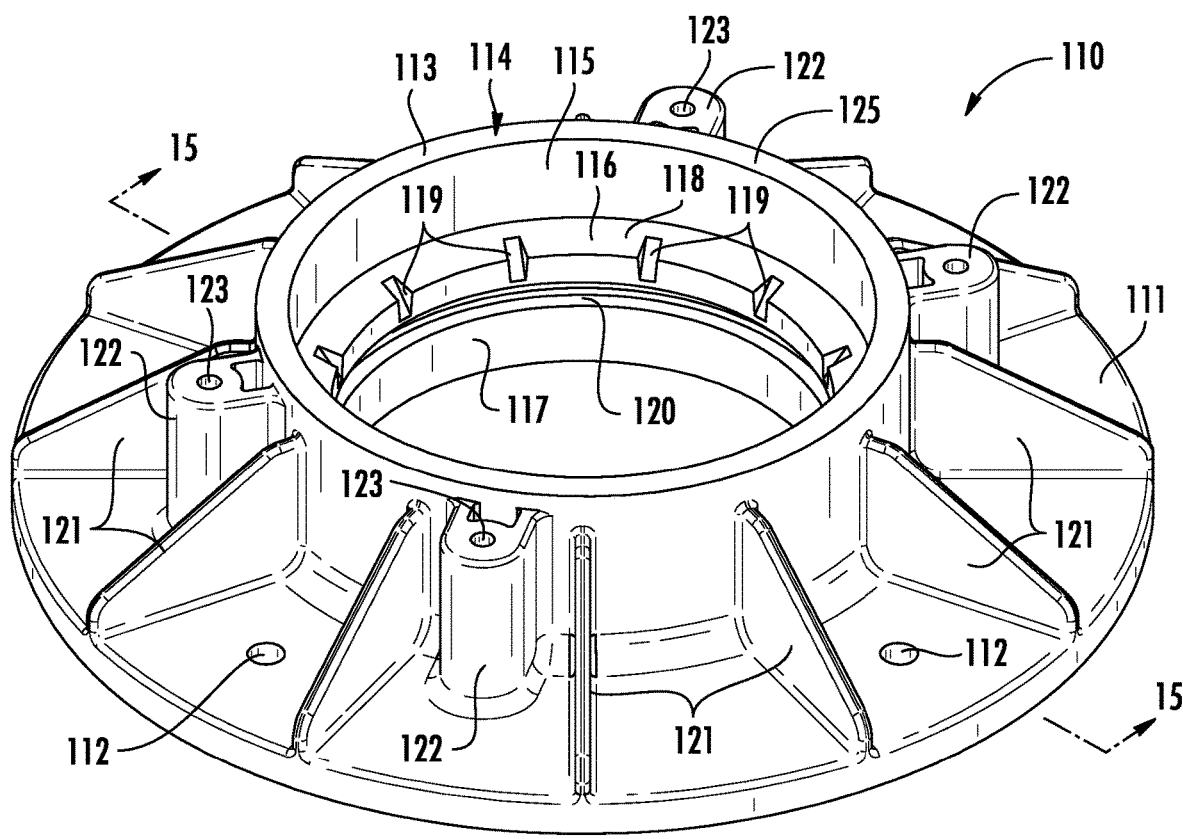
FIG. 14 is a perspective view of a base member of the base.
Figure 15:
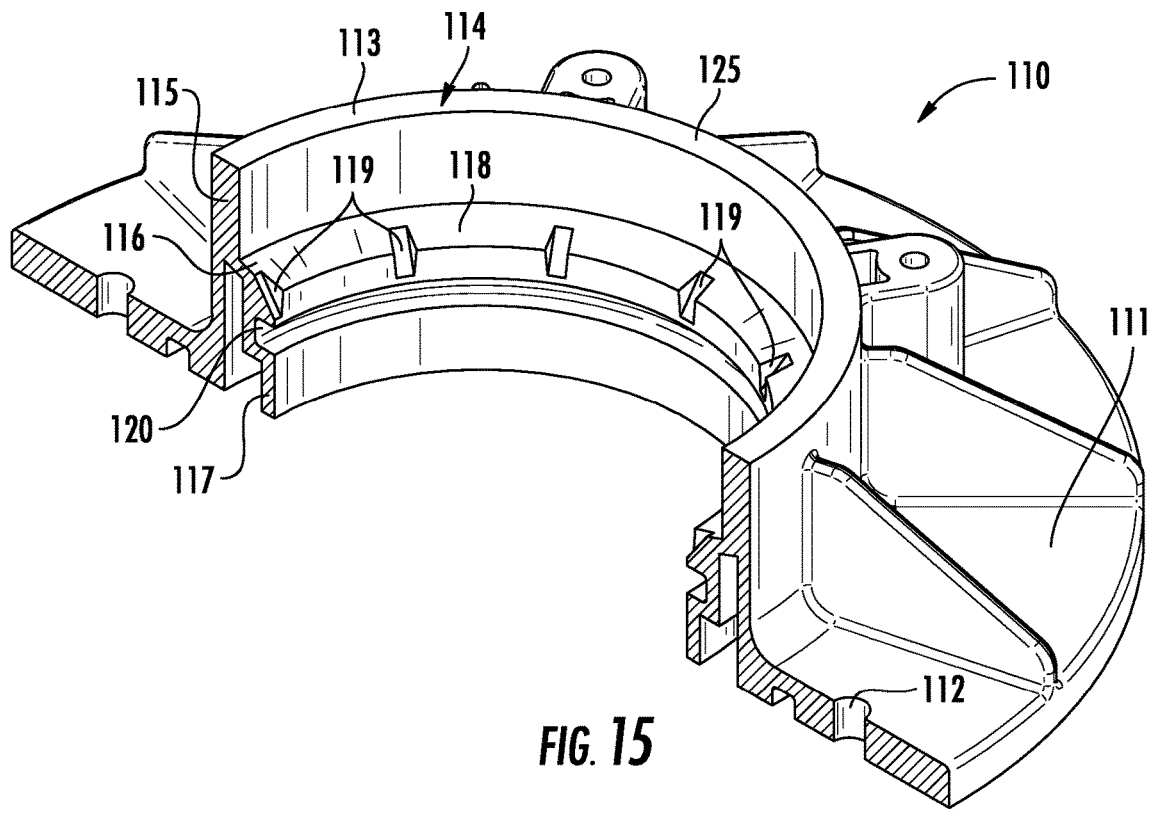
FIG. 15 is a sectional view taken generally along line 15-15 in FIG. 14.
Figure 16:
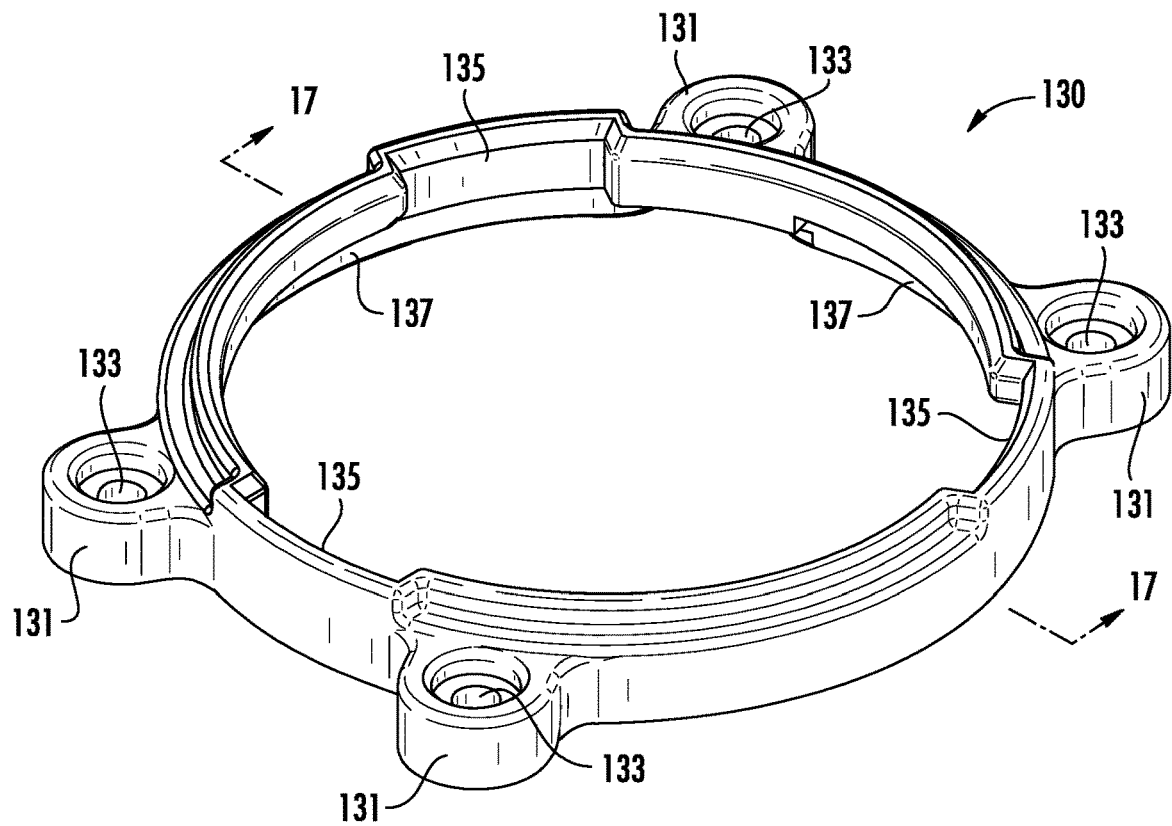
FIG. 16 is a perspective view of the locking ring of the base.
Figure 17:
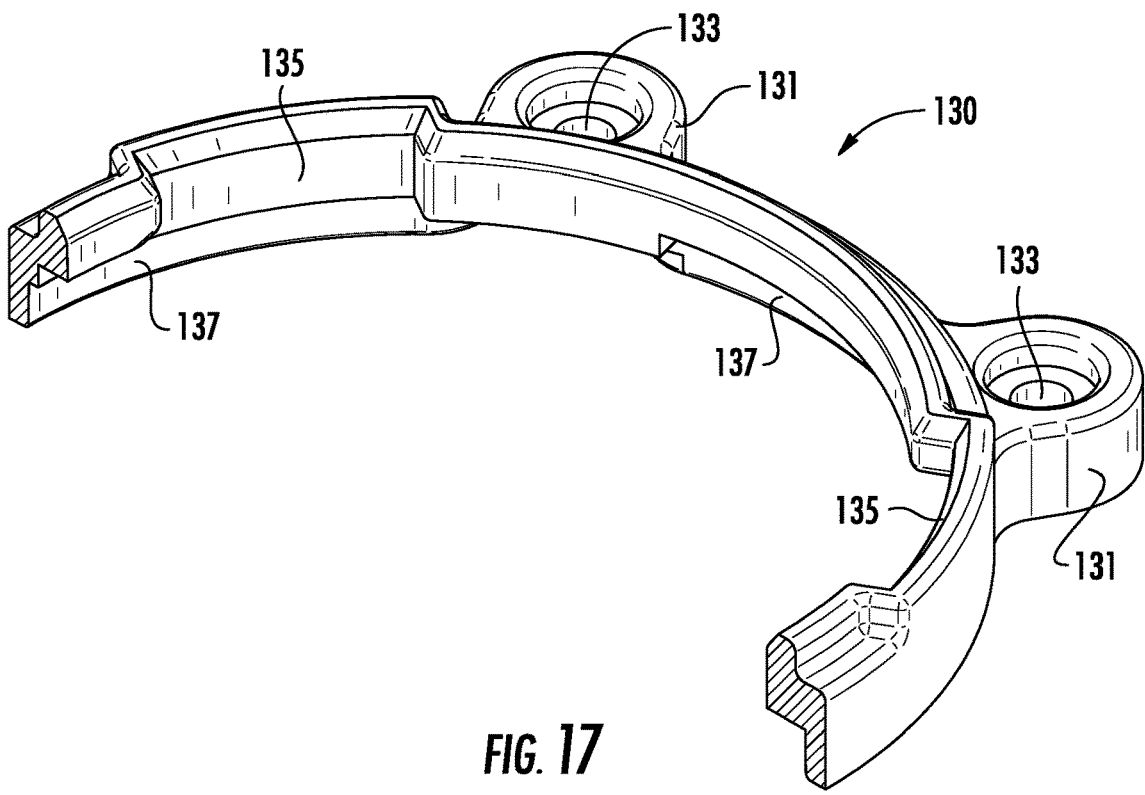
FIG. 17 is a sectional view taken generally along line 17-17 in FIG. 16.

Base 100 includes a central receptacle 101 (FIG. 5) having an inlet 102 and an outlet 103. The inlet 102 is configured to receive at least a portion of valve assembly 30 therein. The outlet 103 is configured to pass or discharge material therethrough. As depicted in FIG. 3, base 100 includes an annular lower base member 110 together with an annular upper base component or locking ring 130 mounted on the upper annular surface 125 of the base member. Referring to FIGS. 14-15, the base member 110 includes a generally annular flange 111 configured for mounting to or on feed mechanism 22. The flange 111 may include a plurality of bores 112 through which fasteners such as bolts (not shown) may extend. The flange 111 may also include an annular groove (not shown) in a lower or mounting surface to receive an O-ring therein to assist in sealing the flange 111 to the feed mechanism 22.

The base member 110 includes a central annular cylindrical section 113 having a stepped circular bore 114 through which material may pass or be discharged. The stepped bore 114 has an upper section 115, an angled central support section 116, and a lower section 117. The upper section 115 has a circular diameter and is dimensioned to receive in close proximity the annular body section 66 of outer valve member 65. The angled central support section 116 has an upper support surface 118 that is tapered or angled downward towards the center of bore 114 and is configured to engage and support the angled mounting surface 81 of outer valve member 65. The lower section 117 has a circular diameter smaller than that of upper section 115 and is dimensioned to receive in close proximity the alignment ring 80 of outer valve member 65.

A plurality of engagement slots or recesses 119 extend downward into the angled upper support surface 118 and through the central support section 116 and into an upper portion of the lower section 117. The engagement slots 119 are configured to receive the engagement tabs 82 of outer valve member 65 therein upon inserting the valve assembly 30 into the stepped bore 114 to form an engagement structure. The engagement structure (i.e., interaction between the engagement tabs 82 and the engagement slots 119) prevents the outer valve member 65 from rotating relative to the base member 110. The lower section 117 may also include an annular groove 120 (FIG. 14) for receiving an O-ring 105 therein to assist in optimizing the seal between the alignment ring 80 and the lower section 117.

A plurality of support ribs 121 may extend between the flange 111 and the central section 113 to provide additional rigidity to the base member 110. A plurality of mounting supports 122 may extend upward from the flange 111 and laterally or radially from the central tube 113. The mounting bosses 122 may include a threaded bore 123.

Locking ring 130 is generally annular and includes a plurality of mounting bosses 131 extending laterally or radially outward and that are configured to be aligned with the mounting supports 122 of base member 110. Fasteners such as screws 132 (FIG. 3) may pass through bores 133 in the mounting bosses 131 and be secured to the mounting supports 122 to secure the locking ring 130 to the base member 110.

Locking ring 130 has three spaced apart annular alignment slots 135. The lower portion 136 of each alignment slot 135 is positioned adjacent the upper surface 125 of the base member 110 when the locking ring 130 is mounted on the base member. An elongated circumferential channel 137 extends circumferentially from the lower portion 136 of each alignment slot 135. Each of the elongated circumferential channels 137 extends in the same direction relative to its respective alignment slot 135. The lower portion 138 of each circumferential channel 137 is positioned against the upper surface 125 of the base member 110 when the locking ring 130 is mounted on the base member.

The direction that the circumferential channels 137 extend from the alignment slots 135 defines the "opening" direction of the material supply system 20. More specifically, rotation of the inner valve member 35 relative to the outer valve member 65 in the opening direction causes the operating tabs 52 to rotate from their respective alignment slots 135 and into their respective circumferential channels 137. Such movement causes the inner valve member 35 to move from a closed position to an open position and thus opens the valve assembly 30.

The alignment slots 135 are configured to sliding receive the operating tabs 52 therein as the valve assembly 30 is inserted into the base 100. The circumferential channels 137 are configured to rotatingly receive the operating tabs 52 therein after the valve assembly 30 is fully inserted into the base member 110 and the inner valve member 35 is rotated relative to the outer valve member 65.

To assemble base 100, base member 110 and locking ring 130 are aligned along a central axis 31 as depicted in FIG. 3. Locking ring 130 is moved relatively towards the base member 110 until a lower surface of the locking ring engages the upper surface 125 of the base member 110. The locking ring 130 is rotated relative to the base member 110 so that the mounting bosses 131 are aligned with the mounting supports 122 of the base member. The locking ring 130 may be rotated into alignment during the process of aligning the locking ring with the base member along central axis 31, while the locking ring is being moved relatively towards the base member 110, and/or once the locking ring is positioned on the mounting base member. Fasteners such as screws 132 may be inserted through the mounting bosses 131 and secured to the mounting supports 122 to secure the locking ring 130 to the base member 110.

Each of the components of the valve assembly 30 and the base 100 may be formed from any desired material. In one example, some or all of the components may be made of high density polyethylene, polypropylene, or any other material.

To utilize the valve assembly 30 and base 100 within a closed loop material feed system, the base 100 is mounted on and secured to any desired structure such as a feed mechanism 22. Fasteners (not shown) may be inserted through bores 112 in the flange 111 of the base member 110 to secure the base 100 to the feed mechanism 22.

Valve assembly 30, in a closed condition, is secured to the tapered discharge section 24 of container 21 in any desired manner. In one embodiment, the tapered discharge section 24 of container 21 may include a plurality of threads (not shown) and the valve assembly 30 is secured to the tapered discharge section by rotating the valve assembly 30 relative to the container 21 so that the threads 27 of the valve assembly engage the threads of the tapered discharge section.

To mount the container 21 and valve assembly 30 on the base 100, the container and valve assembly are positioned above the base 100 along central axis 31. The valve assembly 30 is moved relatively towards the base 100 and rotated so that the operating tabs 52 of the inner valve member 35 are aligned with the alignment slots 135 of the locking ring 130. The valve assembly 30 is further moved towards the base 100 so that the operating tabs 52 are fully inserted into the alignment slots 135 and are generally positioned adjacent the lower portion 136 of each alignment slot.

In such position, each operating tab 52 is aligned with one of the circumferential channels 137. In addition, the annular body section 66 of outer valve member 65 is positioned within the upper section 115 of stepped bore 114 of base member 110 and the annular alignment ring 80 of the outer valve member is positioned within the lower section 117 of the stepped bore of the mounting base member. The angled mounting surface 81 of the outer valve member 65 engages the upper support surface 118 of angled central support section 116 of the stepped bore 114 of base member 110 with each of the engagement tabs 82 positioned in one of the engagement slots 119 in the tapered central section. Interaction between the engagement tabs 82 and the engagement slots 119 prevents relative rotational movement between the outer valve member 65 and base member 110. With the valve assembly 30 in its closed position, no material passes from the container 21 through the valve assembly and base 100, and into the feed mechanism 22.

Rotation of the container 21 in the opening direction transfers a rotational force to the inner valve member 35. Upon the rotational force exceeding a threshold, the container 21 and inner valve member 35 will rotate relative to the outer valve member 65 and base member 110. During such rotation, the operating tabs 52 will rotate within the circumferential channels 137 and the sealing channels 43 in the lower surface 44 of discharge section 40 of inner valve member 35 will rotate away from their respective projections 73 surrounding each opening 71 in the outer valve member 65. The container 21 may continue to be rotated until the operating tabs 52 reached the end of the circumferential channels 137. In instances in which locking channels 45 are provided that encircled the openings 41 in the discharge section 40 of the inner valve member 35, the projection 73 surrounding each opening 71 may engage the locking channels to hold or retain the container 21 and inner valve member 35 in an open position while the material is discharged from the container.

Since the operating tabs 52 are positioned within the circumferential channels 137 while the valve assembly 30 is open, the container 21 and valve assembly 30 may not be removed from the base 100 while the valve assembly is in its open position. In other words, while the valve assembly 30 is in its open position, operating tabs 52 are not aligned with alignment slots 135 so that the circumferential channels 137 prevent the removal of the valve assembly 30 from the base 100.

To remove the container 21 and valve assembly 30 from the base 100, the container and inner valve member 35 are rotated back to their closed position (i.e., the valve assembly is in its closed position) so that the operating tabs 52 are aligned with the alignment slots 135 in the locking ring 130. The valve assembly 30 may then be removed from the base 100 by vertical movement of the valve assembly relative to the base.

FIGS. 18-23 depict an alternate embodiment of a fitment or valve assembly 230 and docking station or base 300. The valve assembly 230 and base 300 may be generally similar or identical to valve assembly 30 and base 100 described above and therefore descriptions of the valve assembly and base are not repeated herein.

Valve assembly 230 includes an inner valve member 235 that is rotatably mounted on and within outer valve member 265. The inner valve member 235 may include an annular body section 236 and a tapered lower discharge section 240. The discharge section 240 includes a plurality of generally triangularly-shaped openings 241 spaced about the discharge section. A pair of operating posts or projections 252 (FIG. 19) may extend radially outward from the body section 236. As depicted, the inner valve member 235 includes two equally spaced apart operating posts 252 but any number of posts may be used.

The discharge section 240 of inner valve member 235 also includes a pair of spaced apart flexible locking arms 290 generally adjacent annular body section 236. Each flexible locking arm 290 may be generally arcuate and is cantilevered from a first end 291 thereof. The second movable end 292 may include a downwardly extending locking pin or member 293.

Outer valve member 265 includes an annular body section 266 and a tapered lower discharge section 270. The discharge section 270 includes a plurality of generally triangularly-shaped openings 271 spaced about the discharge section. A pair of engagement tabs or projections 282 (FIG. 19) may extend radially outward from the body section 266. The number and position of engagement projections 282 corresponds to the number of operating posts 252 of the inner valve member 235. The engagement projections 282 are generally rectangular and are slightly larger than the operating posts 252.

A circumferential slot 283 extends around a portion of the annular body section 266 adjacent each engagement projection and is configured to permit an operating post 252 to slide or pass therethrough. Once the inner valve member 235 and the outer valve member 265 are assembled and the valve assembly 230 is in its closed position, the operating posts 252 are aligned with and positioned above the engagement projections 282.

The discharge section 270 also includes a pair of spaced apart locking receptacles 295. Each locking receptacle 295 is configured to lockingly receive therein one of the locking pins 293 of the locking arms 290 when the inner valve member 235 is in its closed position relative to outer valve member 265.

Locking arms 290 are movable between a first locked position (FIGS. 18-19) at which the locking pins 293 of the locking arms are positioned within and engage the locking receptacles 295 and a second or unlocked position (FIGS. 20-23) at which the locking arms are deflected away from the outer valve member 265 and the locking pins are spaced from the locking receptacles. At the locked position, the valve assembly 230 is locked with the openings 241 of inner valve member 235 being offset from (i.e., not aligned with) the openings 271 of outer valve member 265 so that material may not pass through the valve assembly and into the base 300. At the unlocked position, the valve assembly 230 may be rotated between the closed and open positions so that the openings 241 of inner valve member 235 may be aligned with the openings 271 of outer valve member 265.

Figure 19:
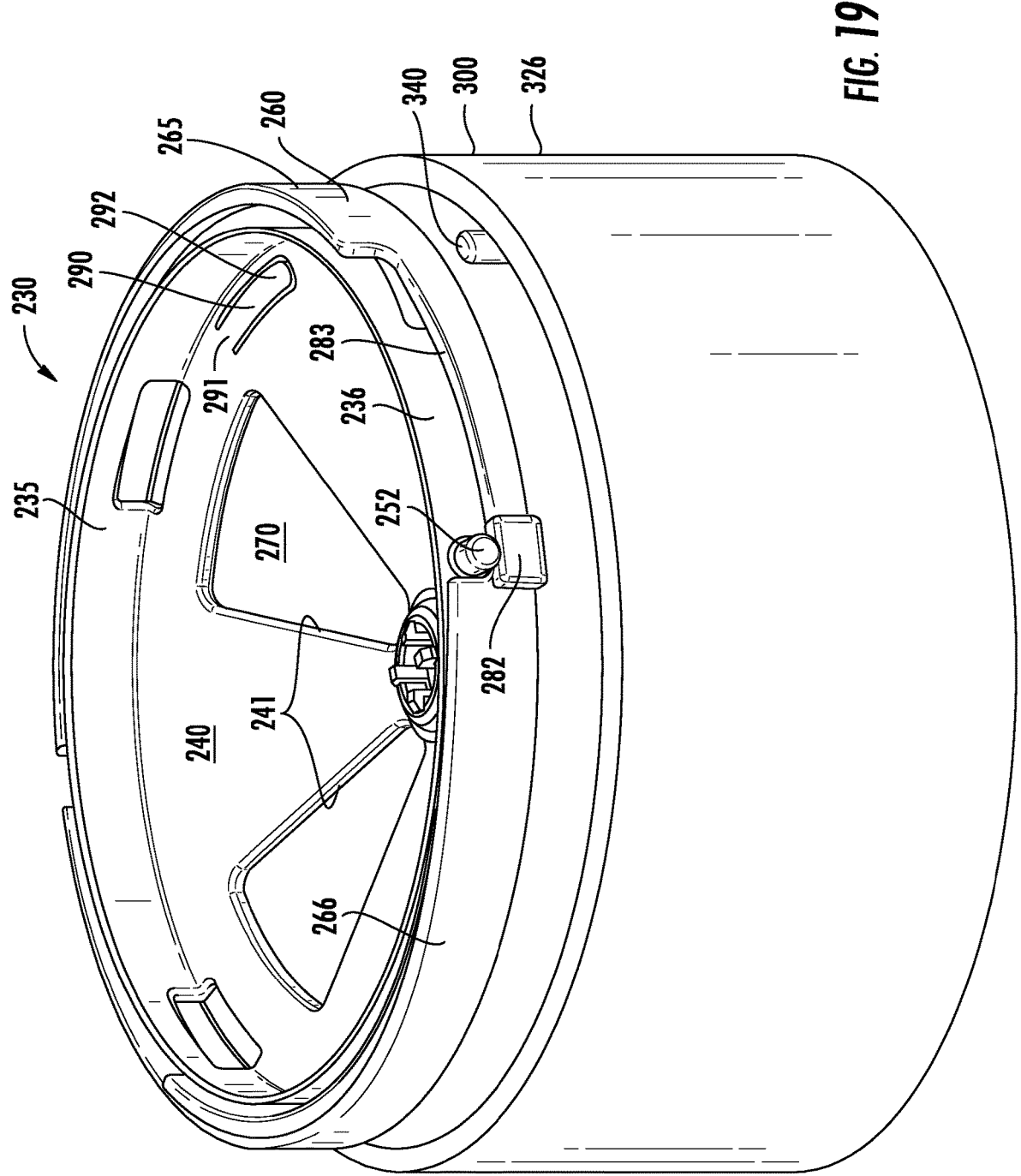
FIG. 19 is an enlarged perspective view of the valve assembly and base of FIG. 18.

Base 300 is configured to receive the valve assembly 230 in a manner generally similar to the valve assembly 30 and base 100 described above. Referring to FIG. 19, base 300 includes a pair of alignment slots 335 that are configured to receive the engagement projections 282 therein. The alignment slots 335 are laterally dimensioned so that the engagement projections 282 may be received therein but the outer valve member 265 may not rotate relative to the base 300. Since the operating posts 252 of the inner valve member 235 are positioned above the engagement projections 282, the operating posts may also be received within the engagement projections.

Base 300 further includes a pair of circumferential slots or channels 337 that extend in the same direction circumferentially from the alignment slots 335. In other words, each alignment slot 335 includes a circumferential channels 337 extending circumferentially therefrom in the direction of rotation of the inner valve member 235. The circumferential channels 337 are configured to permit the operating posts 252 to slide or move therein as the inner valve member 235 rotate relative to the base 300.

Base 300 includes a pair of upwardly extending unlocking projections 340-disposed between the circular bore 314 through which material may pass and the outer surface 326 of the base. As depicted, the unlocking projections 340 have a circular cross-section and are configured to be received within the locking receptacles 295 of the outer valve member 265. The unlocking projections 340 may have other shapes provided that they may be received within the locking receptacles 295.

Figure 18:
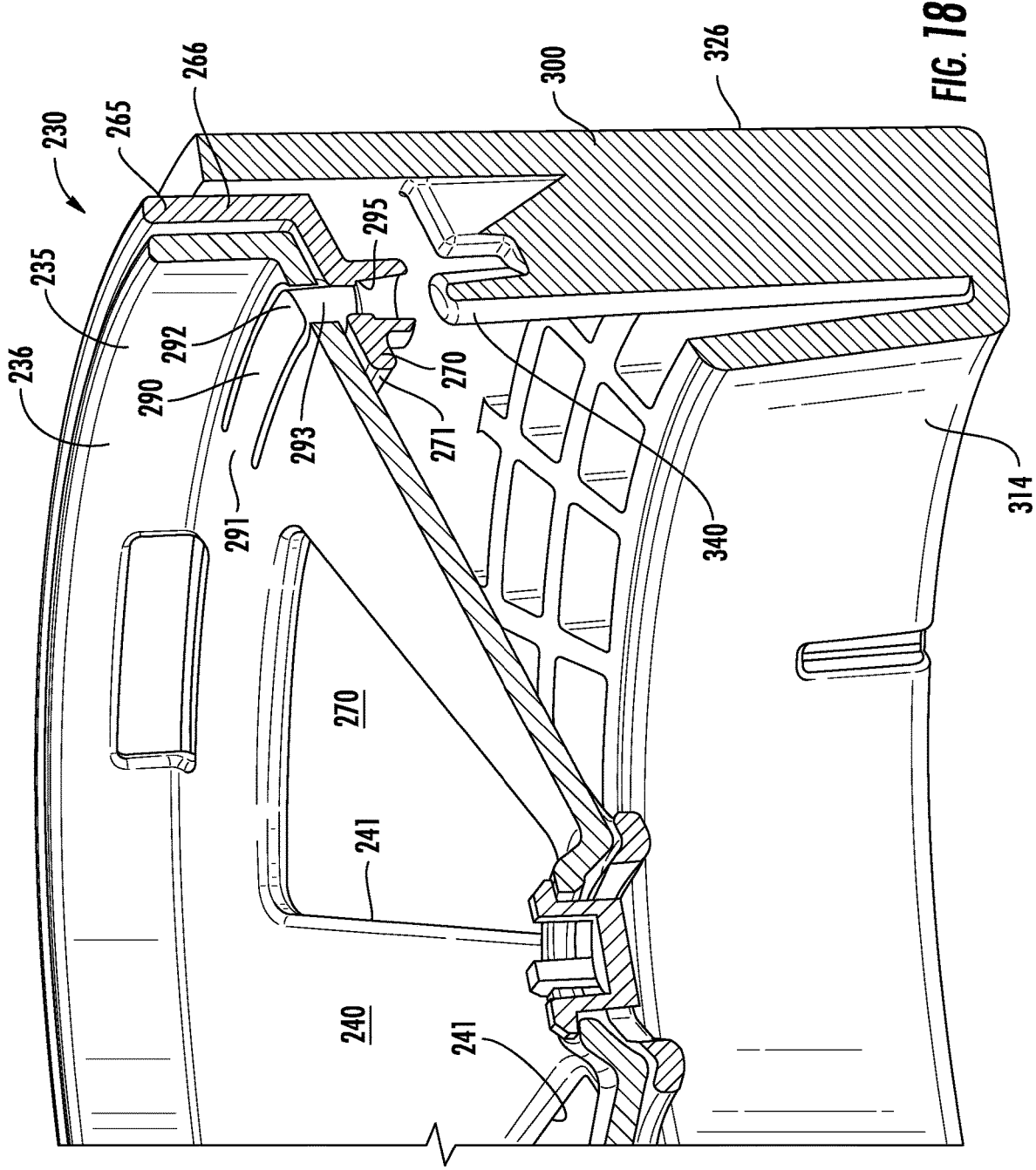
FIG. 18 is an enlarged perspective view of section of a second embodiment of the valve assembly and the base prior to positioning the valve assembly on the base.

Use of the valve assembly 230 and base 300 within a closed loop material feed system may be accomplished as described above. However, because of the interaction between the locking pins 293 of the inner valve member 235 and the locking receptacles 295 of the outer valve member 265, the valve assembly 230 may not be opened until the valve assembly 230 is mounted on the base 300. To mount the container 21 and valve assembly 230 on the base 300, the valve assembly is initially in its closed position with the operating posts 252 aligned with the engagement projections 282 and the valve assembly positioned above the base 300 along central axis 331. As depicted in FIGS. 18-19, the operating posts 252 and engagement projections 282 are aligned with the alignment slots 335 and the unlocking projections 340 of base 300 are aligned with the locking receptacles 295 of discharge section 270.

Figure 20:
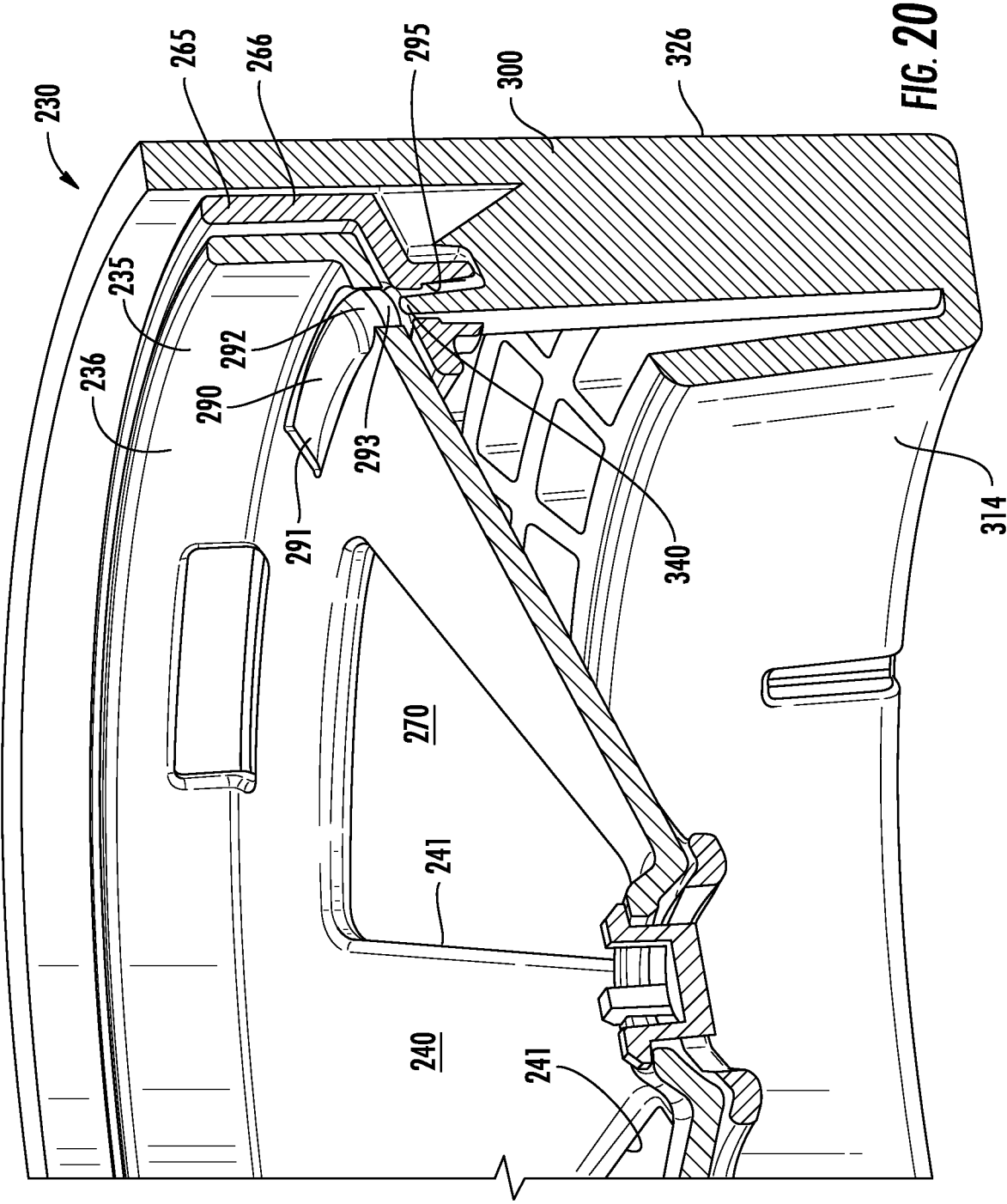
FIG. 20 is an enlarged perspective view similar to FIG. 18 but with the valve assembly mounted on the base.
Figure 21:
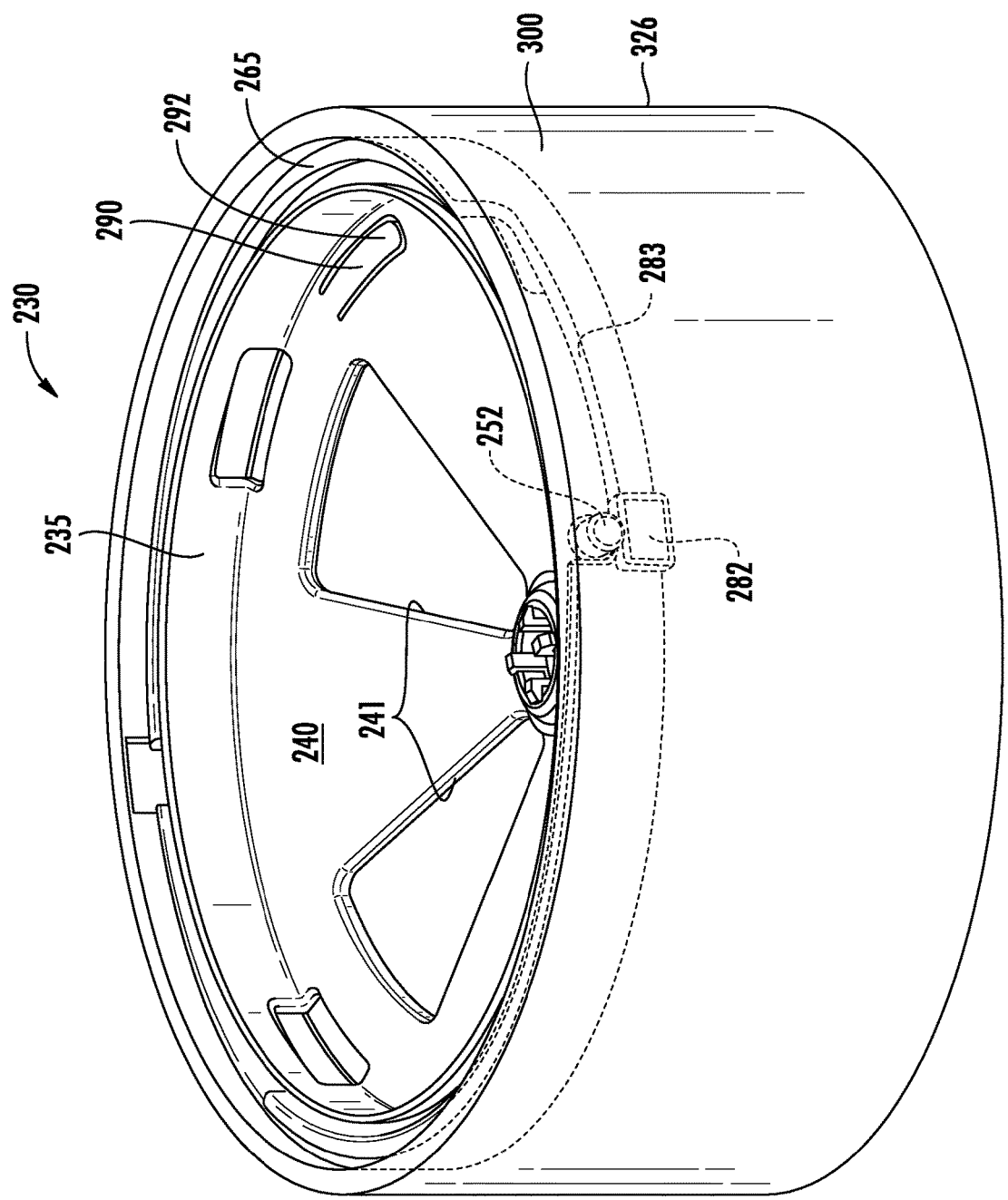
FIG. 21 is an enlarged perspective view of the valve assembly and base of FIG. 20.
Figure 22:
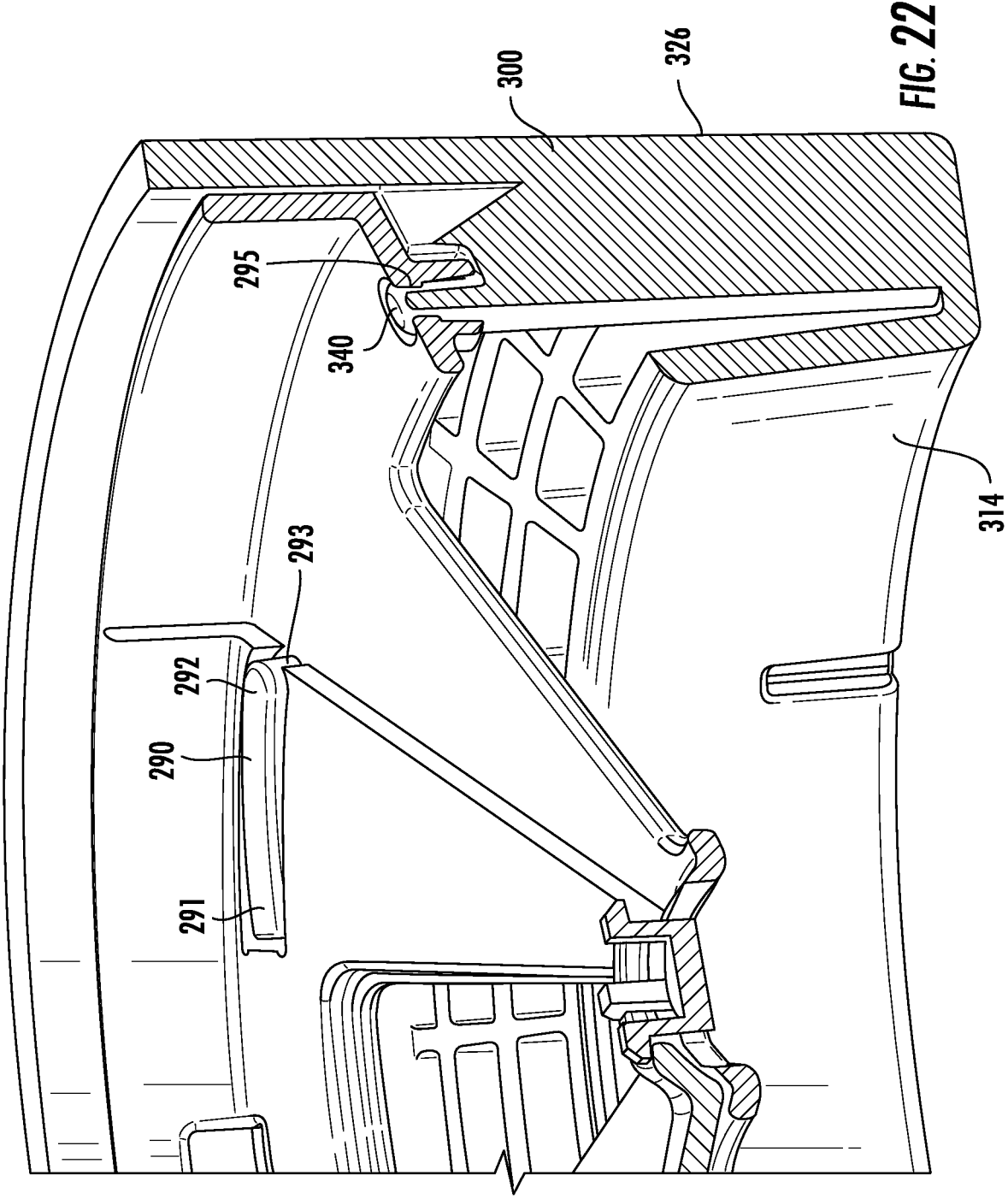
FIG. 22 is an enlarged perspective view similar to FIG. 20 but with the inner valve member rotated relative to the outer valve member.

The valve assembly 230 is further moved towards the base 300 as depicted in FIGS. 20-21 so that the engagement projections 282 are fully inserted into the alignment slots 335. In doing so, the operating posts 252 are aligned with the circumferential channels 337. In addition, the unlocking projections 340 enter the locking receptacles 295, engage the locking pins 293, and deflect the locking arms 290 from their locked position to their unlocked position.

At the unlocked position, the valve assembly 230 may be opened. To do so, the container 21 may be rotated in the opening direction to transfer a rotational force to the inner valve member 235. Upon the rotational force exceeding a threshold, the container 21 and the inner valve member 235 will rotate relative to the outer valve member 265 and the base 300. During such rotation, the operating posts 252 will rotate within the circumferential channels 337 and the lower surface of the locking pins 293 may slide along the outer valve member 265. The container 21 may continue to be rotated until the operating posts 252 reached the end of the circumferential channels 337 at which point the openings 241 of the inner valve member 235 are aligned with the openings 271 of the outer valve member 265.

Interaction between the engagement projections 282 and the engagement slots 335 prevents relative rotational movement between the outer valve member 265 and the base 300. Since the operating posts 252 are positioned within the circumferential channels 337 while the valve assembly 230 is open, the container 21 and the valve assembly may not be removed while the valve assembly is in its open position as described above with respect to valve assembly 30.

Removal of the container 21 and valve assembly 230 from the base 300 is generally identical to that described above with respect to valve assembly 30. One exception, however, is that upon returning the inner valve member 235 to its closed position relative to the outer valve member 265 and removing the valve assembly 230 from base 300, the unlocking projections 340 of the base exit the locking receptacles 295 of the outer valve member. Removal of the projections 340 from the locking receptacles 295 to permit the locking pins 293 on the second ends 292 of the locking arms 290 to re-enter the locking receptacles and thus lock the valve assembly 230 in the closed position.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A material supply assembly comprising:
a valve assembly including:
an outer valve member and an inner valve member,
the outer valve member including an annular outer body section and an outer discharge section, the outer discharge section including a plurality of first openings therein,
the inner valve member including an annular inner body section and an inner discharge section, the inner discharge section including a plurality of second openings therein, the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position,
a plurality of discharge seals between the outer valve member and the inner valve member, one of the discharge seals extending around each of the first openings of the outer valve member or each of the second openings of the inner valve member to provide a seal between the outer valve member and the inner valve member, and
a first circumferential seal between the outer and inner valve members, the first circumferential seal providing a seal between the outer valve member and the inner valve member, the first circumferential seal extending around an inner surface of the annular outer body section of the outer valve member and an outer surface of the annular inner body section of the inner valve member;
and
a base having a receptacle with an inlet and an outlet, the inlet being configured to receive at least a portion of the valve assembly therein and the outlet being configured to pass material therethrough.

2. The assembly of claim 1, wherein the first circumferential seal includes a circumferential seal projection and a complimentary-shaped circumferential seal channel.

3. The assembly of claim 1, further including a second circumferential seal between the outer and inner valve members, the first circumferential seal providing a seal between the outer valve member and the inner valve member, the second circumferential seal providing a second seal between the outer valve member and the inner valve member, the second circumferential seal being disposed adjacent an intersection between the annular outer body section and the outer discharge section.

4. The assembly of claim 3, wherein the second circumferential seal extends around an upper surface of the outer discharge section of the outer valve member and a lower surface of the inner discharge section of the inner valve member.

5. The assembly of claim 1, wherein the first a second circumferential seal is disposed adjacent an intersection between the annular outer body section and the outer discharge section.

6. The assembly of claim 1, wherein a second circumferential seal extends around an upper surface of the outer discharge section of the outer valve member and a lower surface of the inner discharge section of the inner valve member.

7. The assembly of claim 1, further including a securement structure to secure the inner valve member and the outer valve member together, the securement structure includes an annular axle section extending from the inner valve member, the annular axle section having a plurality of vertical slots to define deflectable arms, the outer valve member having an annular receptacle for receiving at least a portion of the annular axle section therein, and further including a tapered guide surface associated with one of the annular axle section and the annular receptacle to facilitate insertion of the annular axle section into the annular receptacle.

8. A material supply assembly comprising:
a valve assembly including:
an outer valve member and an inner valve member,
the outer valve member including an annular outer body section and an outer discharge section, the annular outer body section extending other than a 180° angle to the outer discharge section, the outer discharge section including a plurality of first openings therein,
the inner valve member including an annular inner body section and an inner discharge section, the inner discharge section including a plurality of second openings therein, the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position;
a base having a receptacle with an inlet and an outlet, the inlet being configured to receive at least a portion of the valve assembly therein and the outlet being configured to pass material therethrough; and
an engagement structure between the valve assembly and the base, the engagement structure including a plurality of spaced apart vertical engagement projections on one of the valve assembly and base member and a plurality of complementary configured engagement recesses on another of the valve assembly and base member, each vertical engagement projection being configured to be received in one of the engagement recesses.

9. The assembly of claim 8, wherein the plurality of spaced apart vertical engagement projections are disposed on one of the outer valve member and the base and the plurality of complementary configured engagement recesses are disposed on another of the outer valve member and the base, and engagement of the plurality of engagement projections with the plurality of engagement recesses prevents relative rotation between the outer valve member and the base.

10. The assembly of claim 9, wherein the base includes a plurality of alignment slots and a circumferential channel extending from each alignment slot, and the inner valve member includes a plurality of operating tabs, the operating tabs being configured to be vertically received in one of the alignment slots and aligned with and rotatable within the circumferential channel extending from a respective alignment slot upon the plurality of engagement projections being disposed within the plurality of engagement recesses.

11. A material supply assembly comprising:
a valve assembly including:
an outer valve member and an inner valve member,
the outer valve member including an annular outer body section, an outer discharge section, and a locking receptacle, the outer discharge section including a plurality of first openings therein,
the inner valve member including an annular inner body section, an inner discharge section, and a flexible locking arm, the inner discharge section including a plurality of second openings therein, the flexible locking arm having a locking member configured to be received in the locking receptacle of the outer valve member, the locking member being movable between a first locked position and a second unlocked position, the inner valve member being rotatably disposed on the outer valve member and rotatable relative to the outer valve member between a closed position at which the valve assembly is closed and an open position at which the valve assembly is open, and at the first locked position, the locking member engages the locking receptacle to prevent rotation of the inner valve member relative to the outer valve member from the closed position, and at the second unlocked position, the locking member is spaced from the locking receptacle to permit rotation of the inner valve member relative to the outer valve member from the closed position to the open position;
a base having a receptacle with an inlet and an outlet, the inlet being configured to receive at least a portion of the valve assembly therein and the outlet being configured to pass material therethrough; and
a projection configured to engage the flexible locking arm to move the locking arm from the first locked position to the second unlocked position.

12. The assembly of claim 11, wherein the projection is configured to engage the locking member.

13. The assembly of claim 11, wherein the projection is positioned on the base and extends upward to engage the locking arm upon mounting the valve assembly within the inlet of the base.

14. The assembly of claim 11, wherein the projection extends into the locking receptacle and engages the locking member to move the locking member to the second unlocked position.

15. The assembly of claim 11, wherein the locking receptacle is disposed on the outer discharge section and the locking member is disposed on the inner discharge section.

16. The assembly of claim 11, wherein the base includes a plurality of alignment slots and a circumferential channel extending from each alignment slot, and the inner valve member includes a plurality of operating tabs, the operating tabs being configured to be vertically received in one of the alignment slots and aligned with and rotatable within the circumferential channel extending from a respective alignment slot upon the projection engaging the flexible locking arm to move the locking arm from the first locked position to the second unlocked position.

17. A material supply assembly comprising:
a valve assembly including:
an outer valve member and an inner valve member,
the outer valve member including an annular outer body section and an outer discharge section, the outer discharge section including a plurality of first openings therein, the outer valve member including a lower angled mounting surface,
the inner valve member including an annular inner body section and an inner discharge section, the inner discharge section including a plurality of second openings therein, the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position;
a base having a receptacle with an inlet and an outlet, the inlet being configured to receive at least a portion of the valve assembly therein and the outlet being configured to pass material therethrough, the base including an angled support surface, the lower angled mounting surface of the outer valve member being configured to be disposed on the angled support surface; and
an engagement structure between the valve assembly and the base, the engagement structure including a plurality of spaced apart vertical engagement projections on one of the valve assembly and base member and a plurality of complementary configured engagement recesses on another of the valve assembly and base member, each vertical engagement projection being configured to be received in one of the engagement recesses, wherein one of the plurality of engagement projections and the plurality of the engagement recesses being positioned on the lower angled mounting surface of the outer valve member and another of the plurality of engagement projections and the plurality of the engagement recesses being positioned on the angled support surface of the base.

18. The assembly of claim 17, wherein the receptacle of the base includes a stepped bore with a first section having a first diameter and a second section having a second diameter, the first diameter being greater than the second diameter, and the angled support surface is between the first and second sections.

19. The assembly of claim 18, wherein the angled mounting surface engages the angled support surface to support the valve assembly on the base.

* * * * *

UNITED STATES PATENT AND TRADEMARK OFFICE
CERTIFICATE OF CORRECTION

PATENT NO. : 10,753,483 B2
APPLICATION NO. : 15/814680
DATED : August 25, 2020
INVENTOR(S) : Thaddeus Hans Feiler et al.

Page 1 of 1

It is certified that error appears in the above-identified patent and that said Letters Patent is hereby corrected as shown below:

In the Claims

At Column 14, Line 10, delete "wherein the first a second" and insert --wherein a second--

Signed and Sealed this
Tenth Day of November, 2020

Andrei Iancu
*Director of the United States Patent and Trademark Office*